US012593339B2

(12) United States Patent
Gao et al.

(10) Patent No.: US 12,593,339 B2
(45) Date of Patent: Mar. 31, 2026

(54) DYNAMIC INDICATION OF PHYSICAL UPLINK SHARED CHANNEL (PUSCH) TRANSMISSION TO A SINGLE TRANSMISSION RECEPTION POINT (TRP) OR MULTIPLE TRPs

(71) Applicant: Telefonaktiebolaget LM Ericsson (publ), Stockholm (SE)

(72) Inventors: Shiwei Gao, Nepean (CA); Siva Muruganathan, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 320 days.

(21) Appl. No.: 18/261,164

(22) PCT Filed: Jan. 13, 2022

(86) PCT No.: PCT/IB2022/050274
§ 371 (c)(1),
(2) Date: Jul. 12, 2023

(87) PCT Pub. No.: WO2022/153218
PCT Pub. Date: Jul. 21, 2022

(65) Prior Publication Data
US 2024/0323976 A1 Sep. 26, 2024

Related U.S. Application Data

(60) Provisional application No. 63/138,732, filed on Jan. 18, 2021.

(51) Int. Cl.
*H04W 72/232* (2023.01)
*H04L 5/00* (2006.01)

(52) U.S. Cl.
CPC ......... *H04W 72/232* (2023.01); *H04L 5/0035* (2013.01); *H04L 5/0051* (2013.01)

(58) Field of Classification Search
CPC ... H04L 5/0035; H04L 5/0044; H04L 5/0051; H04L 5/0053; H04L 5/0094; H04W 72/232
See application file for complete search history.

(56) References Cited

U.S. PATENT DOCUMENTS 10,959,250 B2 * 3/2021 Yang ..................... H04L 5/0053
11,503,619 B2 * 11/2022 Yang ..................... H04W 76/11
(Continued)

FOREIGN PATENT DOCUMENTS

EP 4017061 A1 * 6/2022 .......... H04B 7/0404
EP 4096325 A1 * 11/2022 ............ H04W 72/23
(Continued)

OTHER PUBLICATIONS

International Search Report and Written Opinion dated Apr. 7, 2022 issued in PCT Application No. PCT/IB2022/050274 filed Jan. 13, 2022, consisting of 13 pages.
(Continued)

*Primary Examiner* — Eric Nowlin
(74) *Attorney, Agent, or Firm* — Weisberg I.P. Law, P.A.

(57) ABSTRACT

A method, system and apparatus for dynamic indication of physical uplink shared channel (PUSCH) transmission to a single transmission/reception point (TRP) or multiple TRPs are disclosed. According to one aspect, a method in a network node includes configure the WD with a first sounding reference signal, SRS, resource set, and with a second SRS resource set for physical uplink shared channel, PUSCH, and schedule, by sending a downlink control information, DCI, to the WD, a PUSCH transmission by the WD in at least one PUSCH transmission occasion associated with one of the first SRS resource set, the second SRS resource set, and both the first and the second SRS resource sets.

14 Claims, 15 Drawing Sheets

ONE SLOT (14 SYMBOLS)

PDCH (DATA)      CONTROL (PDCCH), POSSIBLY DATA

(56) References Cited

U.S. PATENT DOCUMENTS

| | | | | |
|---|---|---|---|---|
| 11,588,523 | B2 * | 2/2023 | Khoshnevisan ...... | H04L 5/0048 |
| 12,069,678 | B2 * | 8/2024 | Park .................... | H04B 7/0691 |
| 12,101,178 | B2 * | 9/2024 | Matsumura ........... | H04L 5/0053 |
| 12,207,274 | B2 * | 1/2025 | Zheng .................... | H04B 7/024 |
| 12,273,164 | B2 * | 4/2025 | Yuan ..................... | H04B 7/063 |
| 12,395,301 | B2 * | 8/2025 | Yang .................... | H04W 72/23 |
| 12,439,274 | B2 * | 10/2025 | Takahashi ............. | H04W 76/20 |
| 2020/0015250 | A1 * | 1/2020 | Yang .................... | H04B 7/0619 |
| 2020/0053752 | A1 * | 2/2020 | Huang ................. | H04W 72/23 |
| 2020/0205175 | A1 * | 6/2020 | Yang .................... | H04L 5/0058 |
| 2021/0226680 | A1 * | 7/2021 | Khoshnevisan ..... | H04B 7/0404 |
| 2022/0103288 | A1 * | 3/2022 | Matsumura ........... | H04L 5/0035 |
| 2022/0116979 | A1 * | 4/2022 | Park .................... | H04L 5/0053 |
| 2022/0272674 | A1 * | 8/2022 | Go ...................... | H04B 7/0691 |
| 2022/0295298 | A1 * | 9/2022 | Takahashi ............. | H04B 7/0404 |
| 2022/0312440 | A1 * | 9/2022 | Bagheri ............. | H04W 72/044 |
| 2022/0352969 | A1 * | 11/2022 | Yang .................... | H04W 72/23 |
| 2022/0394499 | A1 * | 12/2022 | Matsumura ........... | H04L 5/0051 |
| 2023/0037549 | A1 * | 2/2023 | Zheng .................... | H04B 7/024 |
| 2023/0087394 | A1 * | 3/2023 | Yuan ..................... | H04W 72/23 |
| | | | | 370/329 |
| 2023/0091465 | A1 * | 3/2023 | Yuan ...................... | H04B 7/063 |
| 2023/0137109 | A1 * | 5/2023 | Sun ....................... | H04W 76/15 |
| | | | | 370/329 |
| 2023/0217459 | A1 * | 7/2023 | Khoshnevisan ...... | H04W 72/23 |
| | | | | 370/329 |
| 2023/0224125 | A1 * | 7/2023 | Yuan ................. | H04W 72/1263 |
| | | | | 370/329 |
| 2023/0308160 | A1 * | 9/2023 | Yuan .................... | H04W 72/56 |
| 2023/0354205 | A1 * | 11/2023 | Khoshnevisan .... | H04W 52/281 |
| 2023/0397121 | A1 * | 12/2023 | Matsumura ........... | H04W 52/04 |
| 2024/0015753 | A1 * | 1/2024 | Matsumura ........... | H04L 5/0053 |
| 2024/0114504 | A1 * | 4/2024 | Gao ...................... | H04L 5/0094 |

FOREIGN PATENT DOCUMENTS

| | | | | | |
|---|---|---|---|---|---|
| JP | 7170842 | B2 * | 11/2022 | ........... | H04W 72/23 |
| JP | 7364679 | B2 * | 10/2023 | ........... | H04B 7/0404 |
| WO | WO-2021147763 | A1 * | 7/2021 | ........... | H04W 72/23 |

OTHER PUBLICATIONS

International Preliminary Report on Patentability dated Jan. 20, 2023 issued in PCT Application No. PCT/IB2022/050274 filed Jan. 13, 2022, consisting of 19 pages.

3GPP TSG—RAN WG1 Meeting #103-e; R1-2009251; Source: Qualcomm Incorporated; Title: Enhancements on Multi-TRP for PDCCH, PUCCH and PUSCH; Document for: Discussion/Decision; Agenda Item: 8.1.2.1; e-Meeting, Oct. 26-Nov. 13, 2020, consisting of 33 pages.

3GPP TSG—RAN WG1 Meeting #103-e; R1-2007645; Source: VIVO; Title: Further Discussion on Enhancement of MTRP Operation; Document for: Discussion and Decision; Agenda Item: 8.1.2.1; e-Meeting, Oct. 26-Nov. 13, 2020, consisting of 15 pages.

3GPP TS 38.214 V16.4.0 (Dec. 2020) 3rd Generation Partnership Project; Technical Specification Group Radio Access Network; NR; Physical layer procedures for data (Release 16), consisting of 169 pages.

3GPP TS 38.321 V16.3.0 (Dec. 2020) 3rd Generation Partnership Project; Technical Specification Group Radio Access Network; NR; Medium Access Control (MAC) protocol specification (Release 16), consisting of 156 pages.

3GPP TS 38.213 V16.4.0 (Dec. 2020) 3rd Generation Partnership Project; Technical Specification Group Radio Access Network; NR; Physical layer procedures for control (Release 16), consisting of 181 pages.

Japanese Office Action and English language summary translation of the Japanese Office Action dated Aug. 5, 2024 issued in corresponding Japanese Application No. 2023-541656, consisting of 5 pages.

3GPP TSG RAN WG1#103-e R1-2008914 e-Meeting, Oct. 26-Nov. 13, 2020; Source: Lenovo, Motorola Mobility; Title: Enhancements on SRS; Agenda Item: 8.1.3.; Document for: Discussion, consisting of 7 pages.

3GPP TSG RAN WG1 Meeting #103-e R1-2007764 e-Meeting, Oct. 26-Nov. 13, 2020; Source: ZTE; Title: Multi-TRP enhancements for PDCCH, PUCCH and PUSCH; Agenda Item: 8.1.2.1; Document for: Discussion and Decision, consisting of 22 pages.

* cited by examiner

ONE SLOT (14 SYMBOLS)

PDCH (DATA)

CONTROL (PDCCH), POSSIBLY DATA

1

DYNAMIC INDICATION OF PHYSICAL UPLINK SHARED CHANNEL (PUSCH) TRANSMISSION TO A SINGLE TRANSMISSION RECEPTION POINT (TRP) OR MULTIPLE TRPs

CROSS-REFERENCE TO RELATED APPLICATIONS

This application is a Submission Under 35 U.S.C. § 371 for U.S. National Stage Patent Application of International Application No.: PCT/IB2022/050274, filed Jan. 13, 2022 entitled "DYNAMIC INDICATION OF PHYSICAL UPLINK SHARED CHANNEL (PUSCH) TRANSMIS-SION TO A SINGLE TRANSMISSION RECEPTION POINT (TRP) OR MULTIPLE TRPS," which claims prior-ity to U.S. Provisional Application No. 63/138,732, filed Jan. 18, 2021, entitled "DYNAMIC INDICATION OF PUSCH TRANSMISSION TO A SINGLE TRP OR MUL-TIPLE TRPS," the entireties of both of which are incorpo-rated herein by reference.

TECHNICAL FIELD

The present disclosure relates to wireless communica-tions, and in particular, to dynamic indication of physical uplink shared channel (PUSCH) transmission to a single transmission/reception point (TRP) or multiple TRPs.

BACKGROUND

The Third Generation Partnership Project (3GPP) has developed and is developing standards for Fourth Genera-tion (4G) (also referred to as Long Term Evolution (LTE)) and Fifth Generation (5G) (also referred to as New Radio (NR)) wireless communication systems. Such systems pro-vide, among other features, broadband communication between network nodes, such as base stations, and mobile wireless devices (WD), as well as communication between network nodes and between WDs
NR Frame Structure and Resource Grid NR uses Cyclic Prefix Orthogonal Frequency Division Multiplexing (CP-OFDM) in both downlink (DL) (i.e., from a network node such as a gNB, or base station, to a wireless device or WD) and uplink (UL) (i.e., from a WD to a network node). Discrete Fourier transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically on a slot basis. FIG. 1 is a diagram of an example of a 14-symbol slot, where the first two symbols contain a physical downlink control chan-nel (PDCCH) communication and the remaining symbols contains a physical shared data channel, either a physical downlink shared channel (PDSCH) or a physical uplink shared channel (PUSCH).

Different subcarrier spacing values are supported in NR. The supported subcarrier spacing values (also referred to as different numerologies) are given by $\Delta f=(15 \times 2^\mu)$ kHz where $\mu \in \{0,1,2,3,4\}$. $\Delta f=15$ kHz is the basic subcarrier spacing. The slot durations at different subcarrier spacings is given by $\frac{1}{2^\mu}$ Ms.

2

In the frequency domain, a system bandwidth is divided into resource blocks (RBs), each corresponds to 12 contigu-ous subcarriers. The RBs are numbered starting with 0 from one end of the system bandwidth. The basic NR physical time-frequency resource grid is illustrated in FIG. 2, where only one resource block (RB) within a 14-symbol slot is shown. One OFDM subcarrier during one OFDM symbol interval forms one resource element (RE).

In 3GPP NR Technical Release 15 (3GPP Rel-15), uplink (UL) data transmission can be dynamically scheduled by an uplink grant contained in downlink control information (DCI) carried by a physical downlink control channel (PDCCH). A WD first decodes the uplink grant and then transmits a PUSCH based on the decoded control informa-tion in the uplink grant.

In addition to dynamic scheduling, NR also supports PUSCH transmission with configured grant (CG). There are two types of CGs, Type 1 and Type 2, defined in NR. In CG type 1, the periodicity as well as the start and stop of a PUSCH transmission are configured semi-statically by RRC. In CG type 2, the periodicity is configured by RRC while the start and stop of a PUSCH transmission is signaled dynamically by DCI.

There are three UL DCI formats supported in NR, DCI format 00, DCI format 0_1, and DCI format 0_2. Each DCI contains a number of bit fields, each bit field conveying certain information, including one or more of:
  sounding resource indicator (SRI);
  Precoding information and number of layers; and/or
  TPC (Transmit Power Control) command for scheduled PUSCH The sounding resource indication (SRI) is used to indicate a sounding reference signal (SRS) resource or resources associated with a PUSCH. "Precoding information and number of layers" is used to indicate a transmit precoding matrix indicator (TPMI) and a rank for the PUSCH. The transmit power control command (TPC) is used to indicate a closed-loop power correction for the PUSCH.

In 3GPP NR Rel-15, slot based PUSCH repetition (or PUSCH repetition Type A) is supported in which the number of aggregated slots for both dynamic scheduled and config-ured grant Type 2 are RRC configured. In 3GPP NR Rel-16, this was enhanced so that the number of repetitions can be dynamically indicated, i.e., change from one PUSCH sched-uling occasion to the next. That is, in addition to the starting symbol S, and the length of the PUSCH L, a number of nominal repetitions K is signaled as part of time-domain resource allocation (TDRA).

PUSCH repetition Type B is introduced in 3GPP NR Rel-16 in which a PUSCH can be repeated in multiple mini-slots. When scheduling a transmission with PUSCH repetition Type B, in addition to the starting symbol S, and the length of the PUSCH L, a number of nominal repetitions K is signaled as part of time-domain resource allocation (TDRA).
PUSCH Transmission Schemes In NR, there are two PUSCH transmission schemes: codebook based and non-codebook based schemes.
Codebook Based PUSCH Scheme Codebook based PUSCH is enabled if higher layer param-eter txConfig=codebook. For dynamically scheduled PUSCH and configured grant PUSCH type 2, the codebook based PUSCH transmission scheme can be summarized as follows:
  a PUSCH is associated with one of one or two SRS resources in an SRS resource set with a higher layer parameter usage set to 'CodeBook'. Note that only a single SRS resource set can be configured with usage set to "codebook";

the network node, e.g., gNB, determines a rank and a preferred UL precoder in a codebook based on a selected UL SRS (sounding reference signal) resource among one or two SRS resources configured in a SRS resource set;

the network node, e.g., gNB, indicates the selected SRS resource via a 1-bit SRI field in a DCI scheduling the PUSCH. The SRI field is not present in the DCI if there is only one SRS resource configured in the SRS resource set;

the network node, e.g., gNB, also indicates the rank and the preferred UL precoder via a 'Precoding information and number of layers' field in a DCI; and the WD performs PUSCH transmission using the indicated TPMI and the rank on its antenna ports associated with the indicated SRS resource. The PUSCH is spatially related to the most recent SRS transmission in the indicated SRS resource.

In 3GPP NR Rel-15, only a single SRS resource set can be configured with usage set to "codebook".

Non-Codebook Based PUSCH Scheme

Non-Codebook based UL transmission is supported to enable reciprocity-based PUSCH transmission in which SRS precoding is derived based on a configured DL Channel State Information Reference Signal (CSI-RS) at a WD. It may be assumed that the WD applies the precoder for SRS transmission, resulting in one or more (virtual) SRS ports, each corresponding to a spatial layer. A WD can be configured up to four SRS resources, each with a single (virtual) SRS port, in an SRS resource set. A WD can transmit SRS in the up to four SRS resources and the gNB measures UL channel based on the received SRS and determines the preferred SRS resource(s) for PUSCH transmission.

For PUSCH transmission, the gNB indicates the selected SRS resources via a SRS resource indicator (SRI), where the select SRS resources are jointly encoded using $$\left\lceil \log_2\left(\sum_{k=1}^{min\{L_{max},N_{SRS}\}}\binom{N_{SRS}}{k}\right)\right\rceil \text{ bits,}$$

where $N_{SRS}$ indicates the number of configured SRS resources, and $L_{max}$ is the maximum number of supported layers for PUSCH. Note that in 3GPP NR Rel-15, only a single SRS resource set can be configured with usage set to "non-codebook"

PUSCH Power Control

For each SRI, a pathloss reference signal (RS) and a set of power control parameters (e.g., fractional power control coefficient, P0, closed-loop index) are preconfigured and signaled to a WD. PUSCH open loop transmit power is derived based the SRI indicated in the DCI scheduling the PUSCH and the associated pathloss RS and the set of power control parameters.

Closed-loop power control is done by sending a transmit power control command (TPC) in a 2-bits "TPC command for scheduled PUSCH" field in a DCI scheduling the PUSCH. The mapping between a TPC value and power correction may be defined such as is defined in Clause 7.1.1 of 3GPP Technical Standard (3GPP TS) 38.213.

Transmitting a UL Signal to Multiple TRPs

Up to 3GPP NR Rel-16, it is assumed that PUSCH is always transmitted to a same single transmit and reception point (TRP) by a WD. In 3GPP NR Rel-17, a PUSCH enhancement is to be introduced in which a PUSCH scheduled by a single DCI can be repeated towards to two TRPs. To support that, two SRS resource sets can be configured, each associated with one of the two TRPs for both codebook based and non-codebook based PUSCH schemes. In addition, a WD may be indicated with two SRIs, two TMPIs, two TPCs, each associated one of two TRPs The existing 3GPP NR Rel-15/16 UL DCI formats may only be suitable for scheduling PUSCH transmission towards a single TRP such that transmission to two TRPs may not be supported in existing systems.

SUMMARY

Some embodiments advantageously provide methods, systems, and apparatuses for dynamic indication of physical uplink shared channel (PUSCH transmission to a single transmission/reception point (TRP) or multiple TRPs.

In some embodiments, a new TRP indicator (TRPI) bit field is introduced in one or more of DCI format 0_1 and DCI format 0_2. The TRPI can be used to indicate whether a PUSCH is scheduled to a first TRP, a second TRP, or both the TRPs.

For example, in some embodiments, when a first and a second bit fields in a DCI are associated with the first and the second TRPs, respectively, the TRPI can be used to indicate whether the first, the second, or both the first and the second fields are enabled or valid, i.e.:

TRPI=0: the first bit fields are enabled;

TRPI=1: the second bit fields are enabled; or

TRPI=2: both the first and the second bit fields are enabled.

Some methods enable dynamic switching between single TRP and multi-TRP PUSCH scheduling with a same DCI format.

According to one aspect, a network node configured to communicate with a wireless device (WD) includes processing circuitry configured to: configure the WD with a first sounding reference signal, SRS, resource set, and with a second SRS resource set for physical uplink shared channel, PUSCH; and schedule, by sending a downlink control information, DCI, to the WD, a PUSCH transmission by the WD in at least one PUSCH transmission occasion associated with one of the first SRS resource set, the second SRS resource set, and both the first and the second SRS resource sets.

According to this aspect, in some embodiments, the DCI comprises a bit field that indicates to the WD which one of the first SRS resource set, the second SRS resource set, and both the first and the second SRS resource sets the PUSCH transmission is associated with. In some embodiments, the bit field consists of at least three codepoints, wherein a first codepoint indicates the first SRS resource set, a second codepoint indicates the second SRS resource set, and a third codepoint indicates both the first and the second SRS resource sets. In some embodiments, the DCI that schedules the PUSCH transmission includes a first and a second sounding reference signal resource indicator, SRI, fields. In some embodiments, the DCI that schedules the PUSCH transmission includes a first and a second transmit precoding matrix indicator, TPMI, fields. In some embodiments, the DCI that schedules the PUSCH transmission includes a first and a second transmit power control, TPC, command field. In some embodiments, the PUSCH transmission by the WD associated with the first SRS resource set comprises transmitting the PUSCH according to a first SRS resource indicator, SRI, a first transmit precoding matrix indicator, TPMI, and a first transmit power control, TPC command. In some embodiments, the PUSCH transmission by the WD associated with the second SRS resource set comprises transmitting the PUSCH according to a second SRS resource indicator, SRI, a second transmit precoding matrix indicator, TPMI, and a second transmit power control, TPC command.

According to one aspect, a method in a network node 16 configured to communicate with a WD includes configuring the WD with a first sounding reference signal, SRS, resource set, and with a second SRS resource set for physical uplink shared channel, PUSCH. The method also includes scheduling, by sending a downlink control information, DCI, to the WD, a PUSCH transmission by the WD in at least one PUSCH transmission occasion associated with one of the first SRS resource set, the second SRS resource set, and both the first and the second SRS resource sets.

According to this aspect, in some embodiments, DCI comprises a bit field that indicates to the WD which one of the first SRS resource set, the second SRS resource set, and both the first and the second SRS resource sets the PUSCH transmission is associated with. In some embodiments, the bit field consists of at least three codepoints, wherein a first codepoint indicates the first SRS resource set, a second codepoint indicates the second SRS resource set, and a third codepoint indicates both the first and the second SRS resource sets. In some embodiments, the DCI that schedules the PUSCH transmission includes a first and a second sounding reference signal resource indicator, SRI, fields. In some embodiments, the DCI that schedules the PUSCH transmission includes a first and a second transmit precoding matrix indicators, TPMIs, fields. In some embodiments, the DCI that schedules the PUSCH transmission includes a first and a second transmit power control, TPC, command fields. In some embodiments, the PUSCH transmission by the WD associated with the first SRS resource set comprises transmitting the PUSCH according to a first SRS resource indicator, SRI, a first transmit precoding matrix indicator, TPMI, and a first transmit power control, TPC command. In some embodiments, the PUSCH transmission by the WD associated with the second SRS resource set comprises transmitting the PUSCH according to a second SRS resource indicator, SRI, a second transmit precoding matrix indicator, TPMI, and a second transmit power control, TPC command.

According to yet another aspect, a WD configured to communicate with one or more network nodes, includes a radio interface configured to: receive from one of the one or more network nodes a configuration of a first sounding reference signal, SRS, resource set and a second SRS resource set associated with Physical Uplink Shared Channel, PUSCH, transmission. The radio interface is also configured to receive a downlink control information, DCI, for transmitting a PUSCH by the WD in one at least one PUSCH transmission occasion, the DCI comprising a bit field indicating the PUSCH transmission associated with one of: the first SRS resource set; the second SRS resource set; and both the first and the second SRS resource sets. The radio interface is further configured to transmit the PUSCH associated with the indicated one among the first SRS resource set, the second SRS resource set, and both the first and the second SRS resource sets in the at least one PUSCH transmission occasion.

According to this aspect, in some embodiments, a first codepoint of the bit field indicates the PUSCH transmission associated with the first SRS resource set, a second codepoint of the bit field indicates the PUSCH transmission associated with the second SRS resource set, and a third codepoint of the bit field indicates the PUSCH transmission associated with both the first and the second SRS resource sets. In some embodiments, the WD further includes a radio interface configured to transmit the PUSCH in the at least one PUSCH transmission occasion according to one of a first and second sounding reference signal resource indicator, SRI, one of a first and second transmit precoding matrix indicator, TPMI, and one of a first and second transmit power control, TPC, command when the at least one of the first and second SRS resource set is indicated. In some embodiments, the WD further includes a radio interface configured to transmit the PUSCH in at least a first transmission occasion according to one of a first sounding reference signal resource indicator, SRI, a first TPMI, and a first TPC and in a second transmission occasion(s) according to one of a second SRI, a second TPMI, and a second TPC when both the first and the second SRS resource sets are indicated by the third codepoint.

According to yet another aspect, a method in a WD includes receiving from one of one or more network nodes a configuration of a first sounding reference signal, SRS, resource set and a second SRS resource set associated with Physical Uplink Shared Channel, PUSCH, transmission. The method also includes receiving a downlink control information, DCI, for transmitting a PUSCH by the WD in one at least one PUSCH transmission occasion, the DCI comprising a bit field indicating the PUSCH transmission associated with one of: the first SRS resource set; the second SRS resource set; and both the first and the second SRS resource sets. The radio interface is further configured to transmit the PUSCH associated with the indicated one among the first SRS resource set, the second SRS resource set, and both the first and the second SRS resource sets in the at least one PUSCH transmission occasion.

According to this aspect, in some embodiments, a first codepoint of the bit field indicates the PUSCH transmission associated with the first SRS resource set, a second codepoint of the bit field indicates the PUSCH transmission associated with the second SRS resource set, and a third codepoint of the bit field indicates the PUSCH transmission associated with both the first and the second SRS resource sets. In some embodiments, the method includes transmitting the PUSCH in the at least one PUSCH transmission occasion according to one of a first and second sounding reference signal resource indicator, SRI, one of a first and second transmit precoding matrix indicator, TPMI, and one of a first and second transmit power control, TPC, command when the at least one of the first and second SRS resource set is indicated. In some embodiments, the method includes transmitting the PUSCH in at least a first transmission occasion according to one of a first sounding reference signal resource indicator, SRI, a first TPMI, and a first TPC and in a second transmission occasion(s) according to one of a second SRI, a second TPMI, and a second TPC when both the first and the second SRS resource sets are indicated by the third codepoint.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
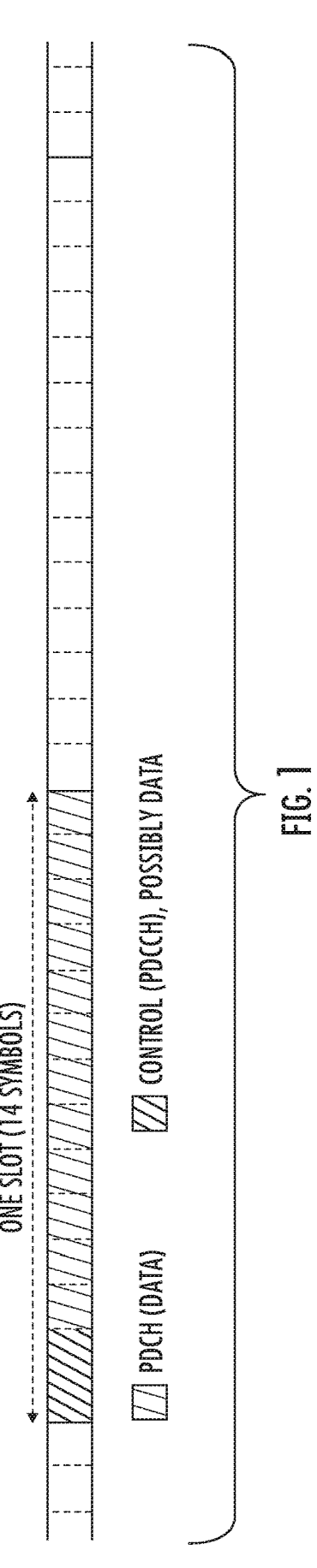
FIG. 1 is a diagram of an example NR time domain structure with 15 kHz subcarrier spacing.
Figure 2:
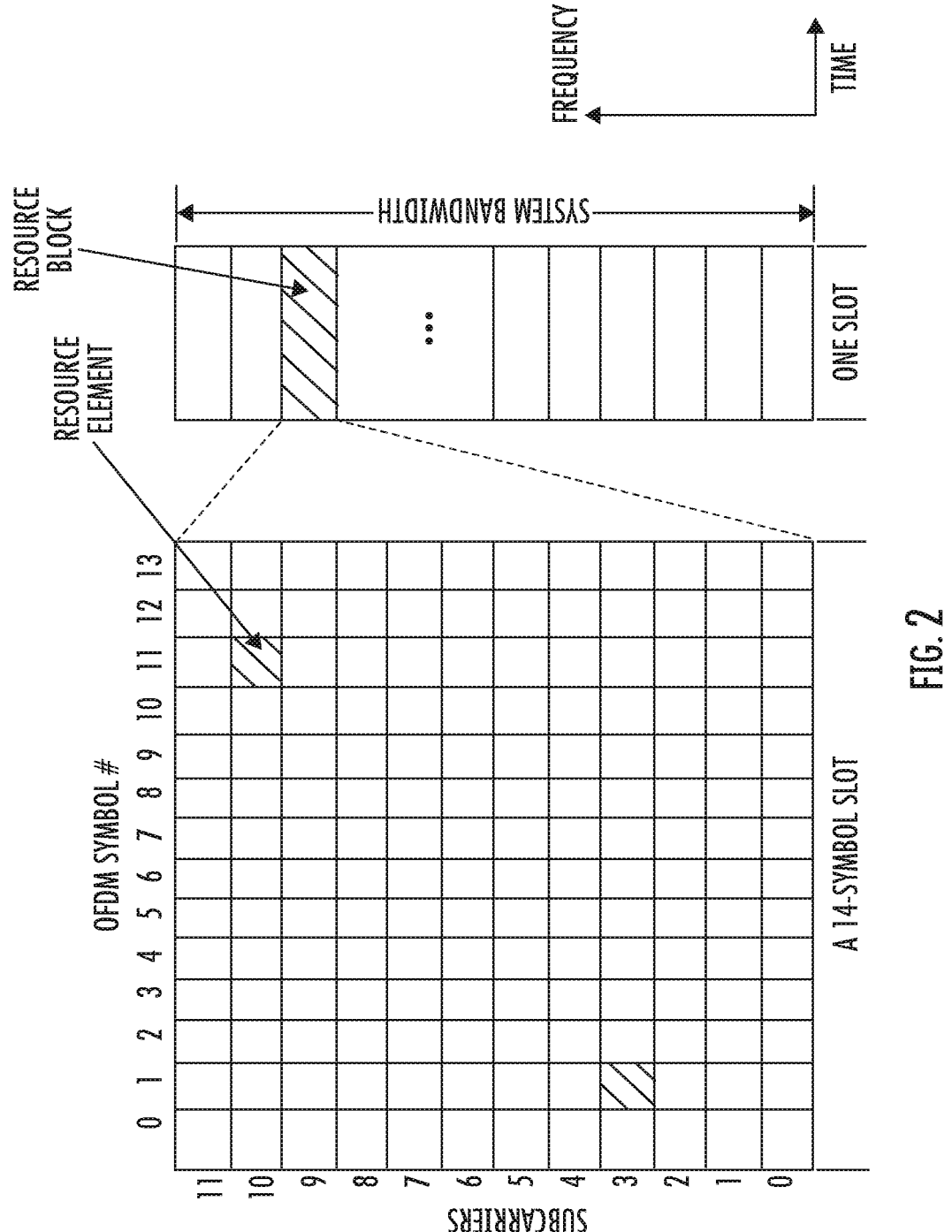
FIG. 2 is a diagram of an example NR physical resource grid.

As discussed above, the existing 3GPP NR Rel-15/16 UL DCI formats may only be suitable for scheduling PUSCH transmission towards a single TRP. While support for PUSCH transmission to multiple TRPs, two SRIs, two TMPIs, and two TPCs in UL DCI formats for PUSCH transmission to two TRPs has been considered, it is an unresolved issue of how to support PUSCH transmission to a single TRP and PUSCH transmission to multiple TRPs with a same DCI format. The present disclosure solves at least in part the issue described above and/or other issues as described herein.

Before describing in detail example embodiments, it is noted that the embodiments reside primarily in combinations of apparatus components and processing steps related to dynamic indication of physical uplink shared channel (PUSCH transmission to a single transmission/reception point (TRP) or multiple TRPs.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

The term "radio node" used herein may be used to also denote a wireless device (WD) such as a wireless device (WD) or a radio network node. In this disclosure, the term network node may be used interchangeably with the term gNB. However, the principles disclosed herein are not limited to a gNB, and may be applied to different kinds of base stations and/or other network nodes that are configured to operate according to principles set forth herein.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-JOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, a transmission reception point (TRP) may be either a network node, a radio head, etc. A TRP may be represented by a spatial relation or a TCI state in some embodiments. In some embodiments, a TRP may be using multiple TCI states. In some embodiments, a TRP may a part of the network node transmitting and receiving radio signals to/from the WD according to physical layer properties and parameters inherent to that element. In some embodiments, in Multiple Transmit/Receive Point (multi-TRP) operation, a serving cell can schedule the WD from two TRPs, providing better PDSCH coverage, reliability and/or data rates. There are two different operation modes for multi-TRP: single-DCI and multi-DCI. For both modes, control of uplink and downlink operation is done by both physical layer and medium access control (MAC). In single-DCI mode, the WD is scheduled by the same DCI for both TRPs and in multi-DCI mode, the WD is scheduled by independent DCIs from each TRP. Herein, a TRP may be a network node and there may typically be multiple network nodes involved with communication to and from the same WD, each such network node being a TRP with respect to the WD.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide dynamic indication of physical uplink shared channel (PUSCH transmission to a single transmission/reception point (TRP) or multiple TRPs.

Figure 3:
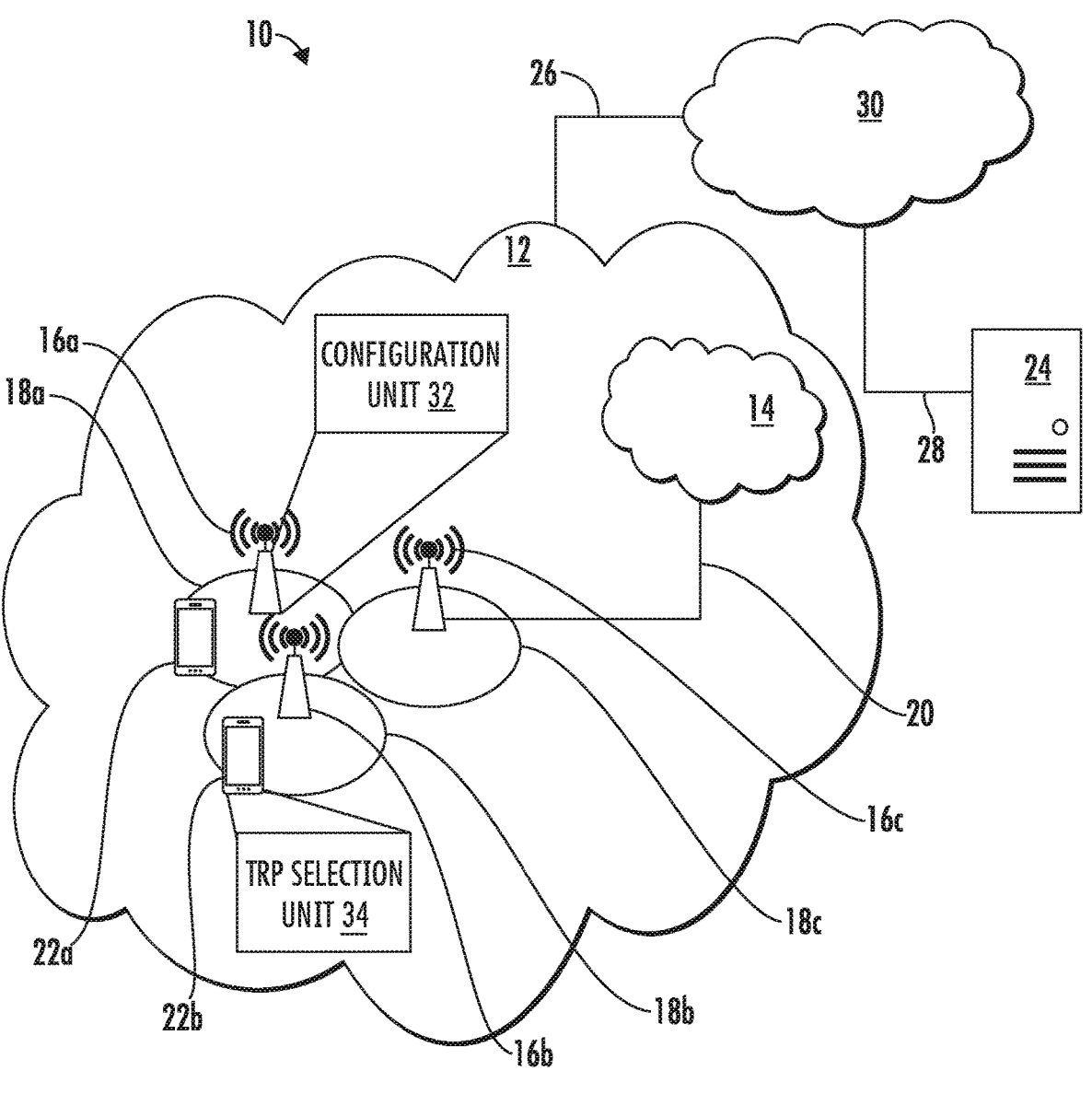
FIG. 3 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. Each such or more network node 16 acts as a TRP for the WD 22. For example, a WD 22 can have dual connectivity with a network node 16a that supports LTE and the same or a different network node 16b that supports NR. As an example, WD 22a can be in communication with an eNB for LTE/E-UTRAN and a gNB for NR/Next Generation-RAN. Thus, FIG. 3 shows a WD 16a being served by two network node TRPs 16a and 16b. In some embodiments more than one or more network nodes can serve as a TRP for the same WD.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to configure a WD 22 with a first sounding reference signal (SRS, resource set, and with a second SRS resource set for physical uplink shared channel, (PUSCH). A wireless device 22 is configured to include a radio interface 82 which is configured to transmit the PUSCH associated with the indicated one among the first SRS resource set, the second SRS resource set, and both the first and the second SRS resource sets in the at least one PUSCH transmission occasion. The wireless device may also include a TRP selection unit 34 (not shown) configured to select one or more transmission/reception points (TRP) to which to transmit a physical uplink shared channel (PUSCH) transmission, the TRPs being selected according to downlink control information (DCI) received from a network node.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 which is configured to configure a WD 22 with a first sounding reference signal (SRS, resource set, and with a second SRS resource set for physical uplink shared channel, (PUSCH).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. In one or more embodiments, the radio interface 82 is configured to transmit the PUSCH associated with the indicated one among the first SRS resource set, the second SRS resource set, and both the first and the second SRS resource sets in the at least one PUSCH transmission occasion.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include TRP selection unit 34 which is configured to select one or more transmission/reception points (TRP) to which to transmit a physical uplink shared channel (PUSCH) transmission, the TRPs being selected according to downlink control information (DCI) received from a network node.

Figure 4:
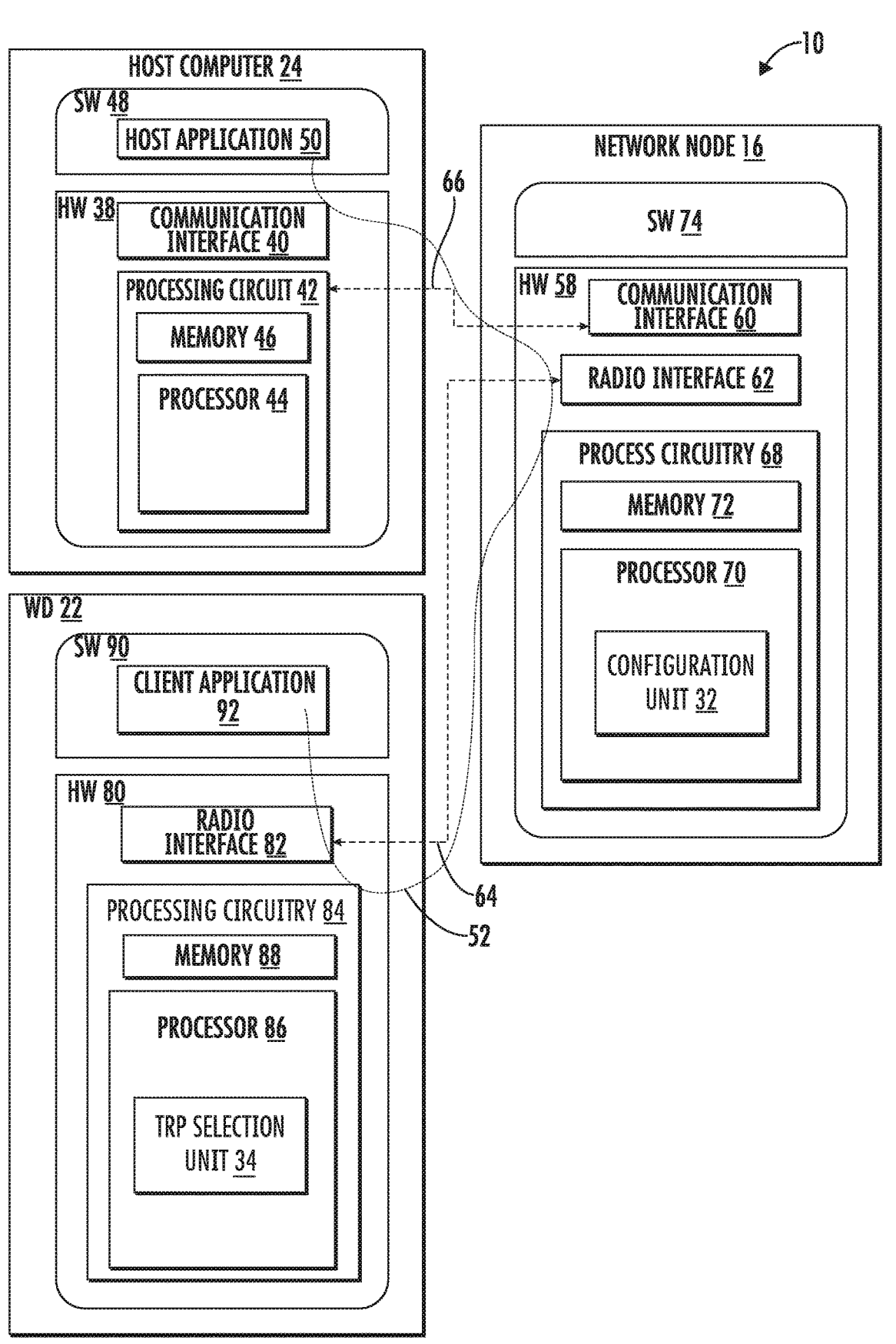
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32 and TRP selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
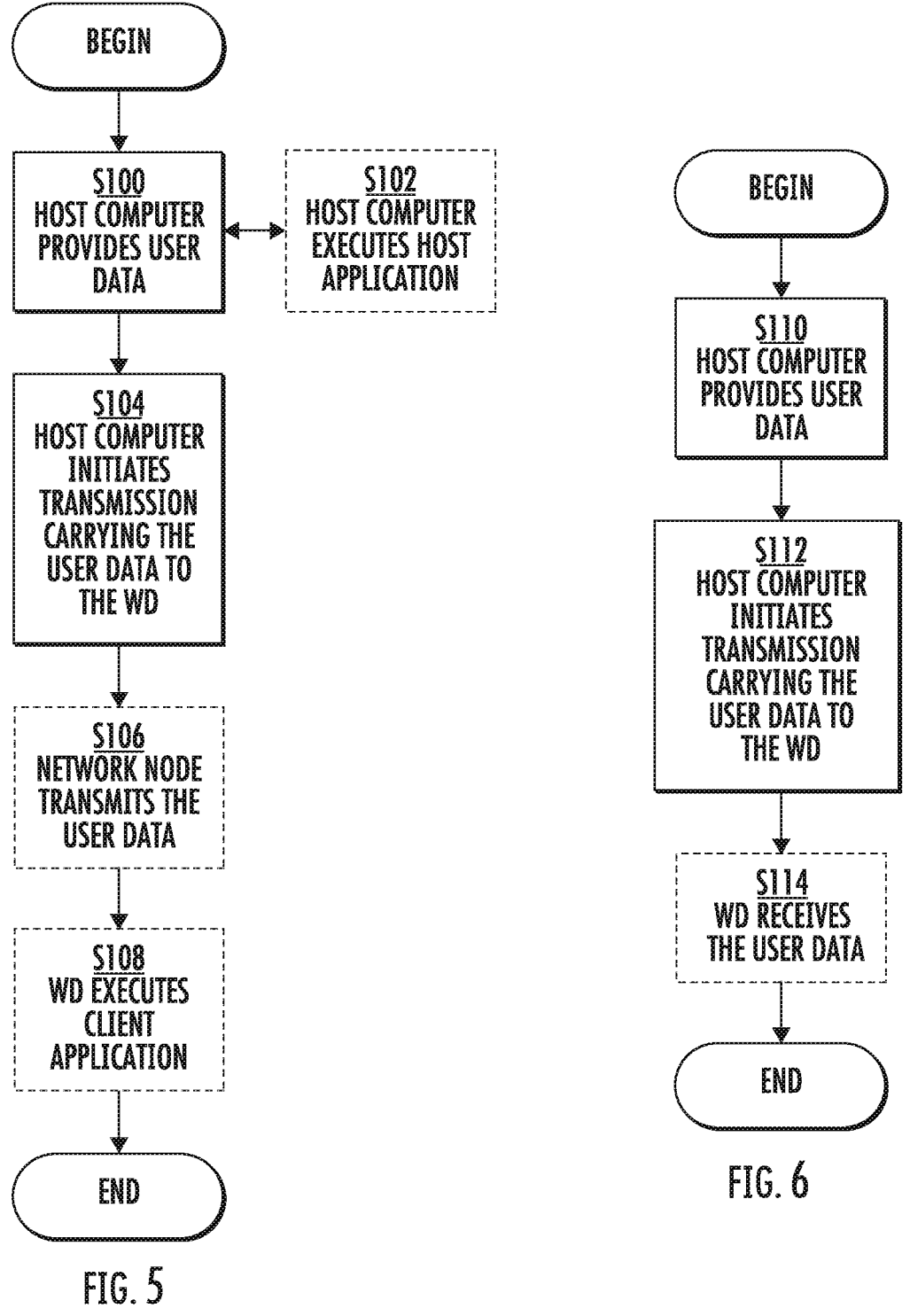
FIG. 5 is a flowchart illustrating example methods implemented in a communication system including a host computer, a network node and a wireless device for executing a client application at a wireless device according to some embodiments of the present disclosure.
FIG. 6 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
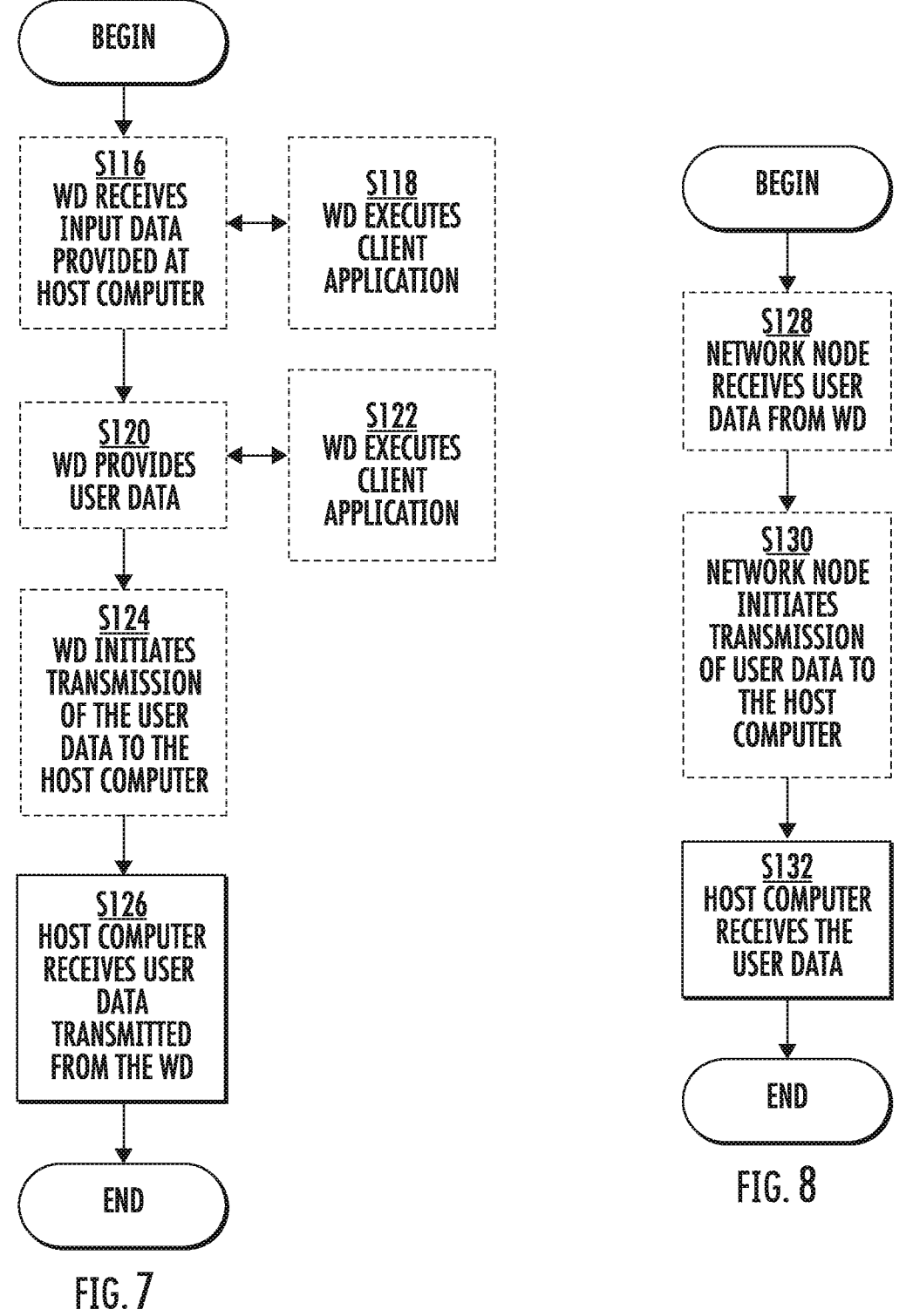
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
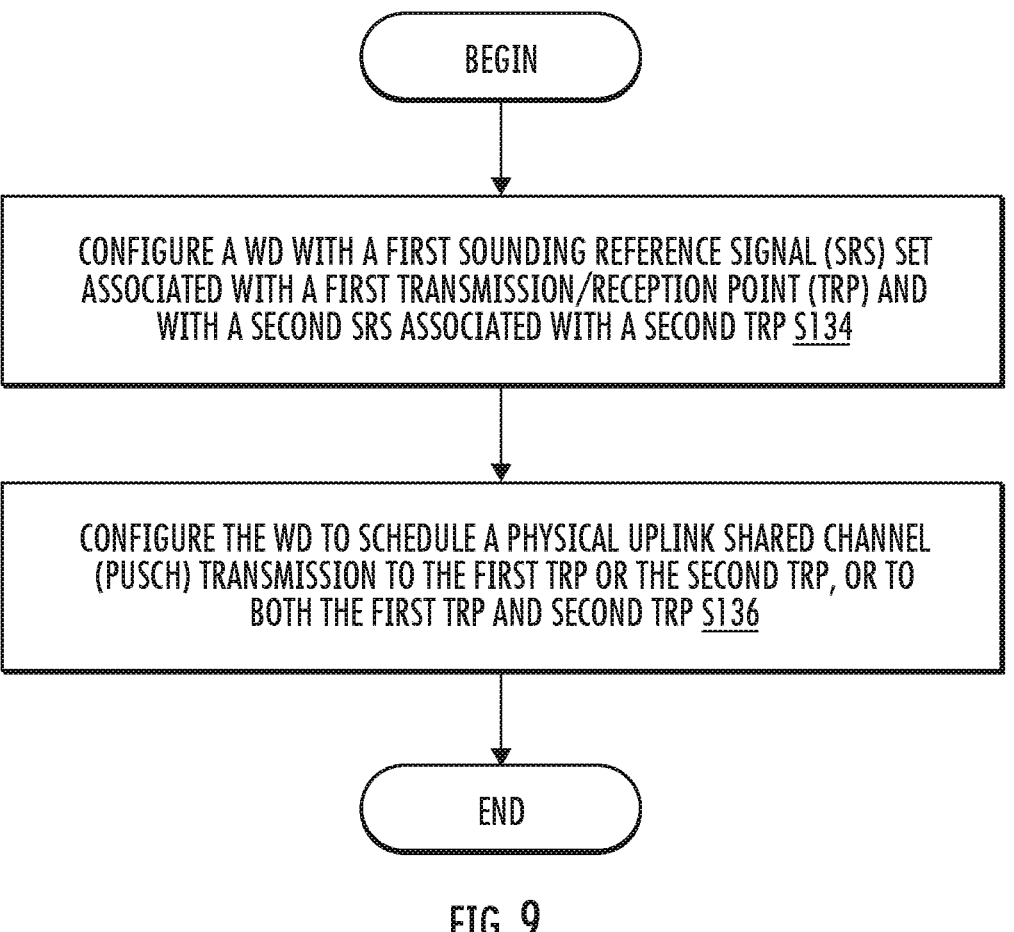
FIG. 9 is a flowchart of an example process in a network node according to some embodiments of the present disclosure.

FIG. 9 is a flowchart of an example process in a network node 16 for dynamic indication of physical uplink shared channel (PUSCH transmission to a single transmission/reception point (TRP) or multiple TRPs. One or more blocks described herein may be performed by one or more elements of network node 16 such as by one or more of processing circuitry 68 (including the configuration unit 32), processor 70, radio interface 62 and/or communication interface 60. Network node 16 is configured to configure a WD with a first sounding reference signal (SRS) set associated with a first transmission/reception point (TRP) and with a second SRS associated with a second TRP (Block S134). The process also includes configuring the WD to schedule a physical uplink shared channel (PUSCH) transmission to the first TRP or the second TRP, or to both the first TRP and second TRP (Block S136). In some embodiments, only some of these steps are performed by a network node 16. In some of these embodiments, results associated with steps not performed by the network node 16 are either performed elsewhere and derived and/or obtained by the network node 16 in a different manner, or they may be replaced by alternate steps.

Figure 10:
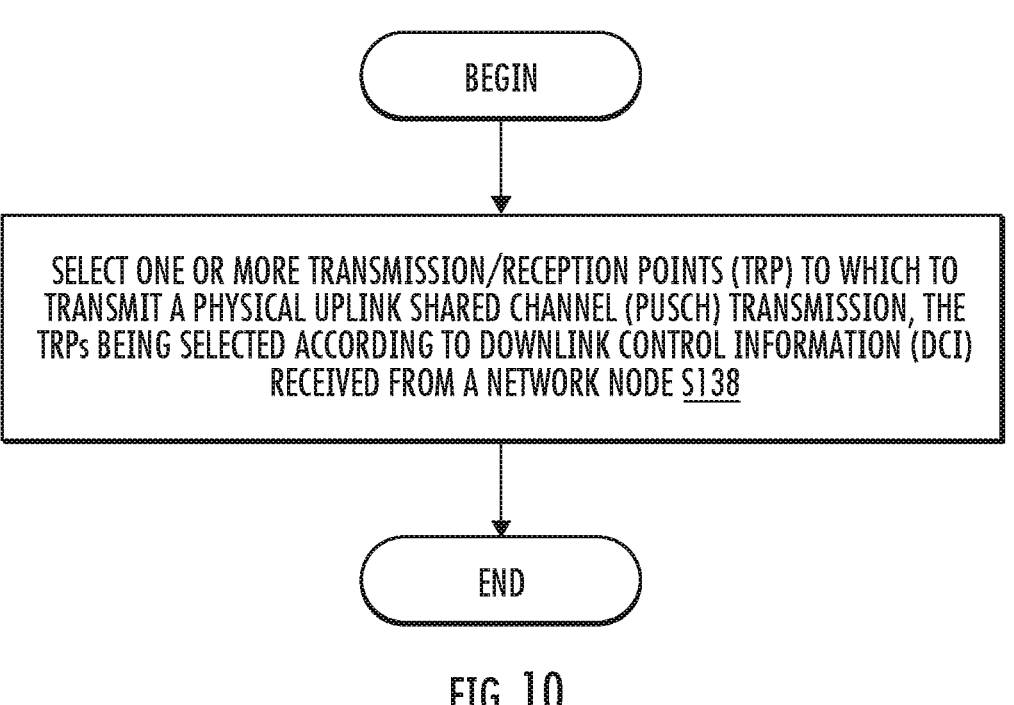
FIG. 10 is a flowchart of an example process in a wireless device according to some embodiments of the present disclosure.

FIG. 10 is a flowchart of an example process in a wireless device 22 according to some embodiments of the present disclosure. One or more blocks described herein may be performed by one or more elements of wireless device 22 such as by one or more of processing circuitry 84 (including the TRP selection unit 34), processor 86, radio interface 82 and/or communication interface 60. Wireless device 22 is configured to select one or more transmission/reception points (TRP) to which to transmit a physical uplink shared channel (PUSCH) transmission, the TRPs being selected according to downlink control information (DCI) received from a network node (Block S138). In some of these embodiments, results associated with steps not performed by the WD 22 are either performed elsewhere and derived and/or obtained by the WD 22 in a different manner, or they may be replaced by alternate steps.

Figure 11:
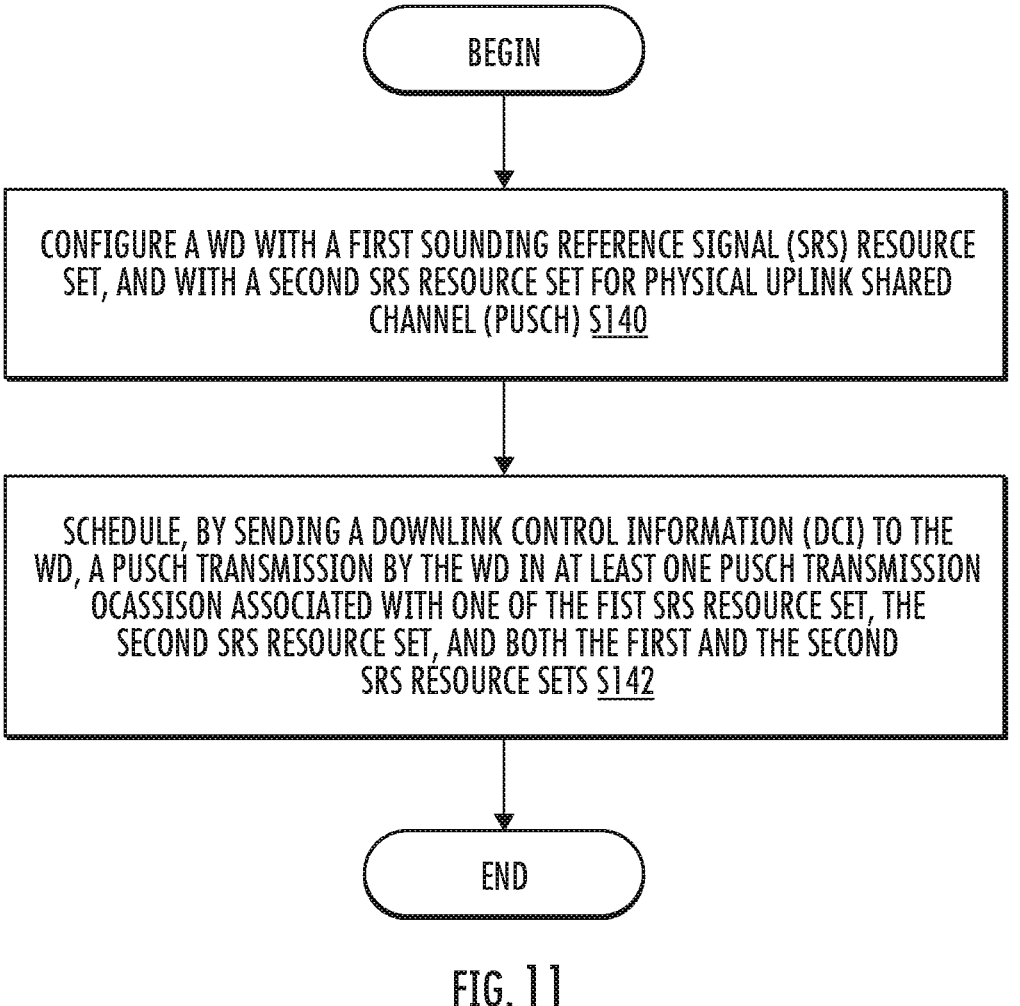
FIG. 11 is a flowchart of another process in a network node according to some embodiments of the present disclosure.

FIG. 11 is a flowchart of an example process in a network node 16 according to some embodiments of the present disclosure. One or more blocks described herein may be performed by one or more elements of network node 16 such as by one or more of processing circuitry 68 (including the configuration unit 32), processor 70, radio interface 62 and/or communication interface 60. Network node 16 is configured to configure the WD 22 with a first sounding reference signal, SRS, resource set, and with a second SRS resource set for physical uplink shared channel, PUSCH (Block S140). The process also includes and scheduling, by sending a downlink control information, DCI, to the WD 22, a PUSCH transmission by the WD 22 in at least one PUSCH transmission occasion associated with one of the first SRS resource set, the second SRS resource set, and both the first and the second SRS resource sets (Block S142).

In some embodiments, DCI comprises a bit field that indicates to the WD 22 which one of the first SRS resource set, the second SRS resource set, and both the first and the second SRS resource sets the PUSCH transmission is associated with. In some embodiments, the bit field consists of at least three codepoints, wherein a first codepoint indicates the first SRS resource set, a second codepoint indicates the second SRS resource set, and a third codepoint indicates both the first and the second SRS resource sets. In some embodiments, the DCI that schedules the PUSCH transmission includes a first and a second sounding reference signal resource indicator, SRI, fields. In some embodiments, the DCI that schedules the PUSCH transmission includes a first and a second transmit precoding matrix indicators, TPMIs, fields.

In some embodiments, the DCI that schedules the PUSCH transmission includes a first and a second transmit power control, TPC, command fields. In some embodiments, the PUSCH transmission by the WD 22 associated with the first SRS resource set comprises transmitting the PUSCH according to a first SRS resource indicator, SRI, a first transmit precoding matrix indicator, TPMI, and a first transmit power control, TPC, command. In some embodiments, the PUSCH transmission by the WD 22 associated with the second SRS resource set comprises transmitting the PUSCH according to a second SRS resource indicator, SRI, a second transmit precoding matrix indicator, TPMI, and a second transmit power control, TPC command. In some embodiments, the PUSCH transmission by the WD 22 associated with both the first and second SRS resource sets comprises transmitting the PUSCH according to a first and second SRS resource indicator, SRI, a first and second transmit precoding matrix indicator, TPMI, and a first and second transmit power control, TPC command.

Figure 12:
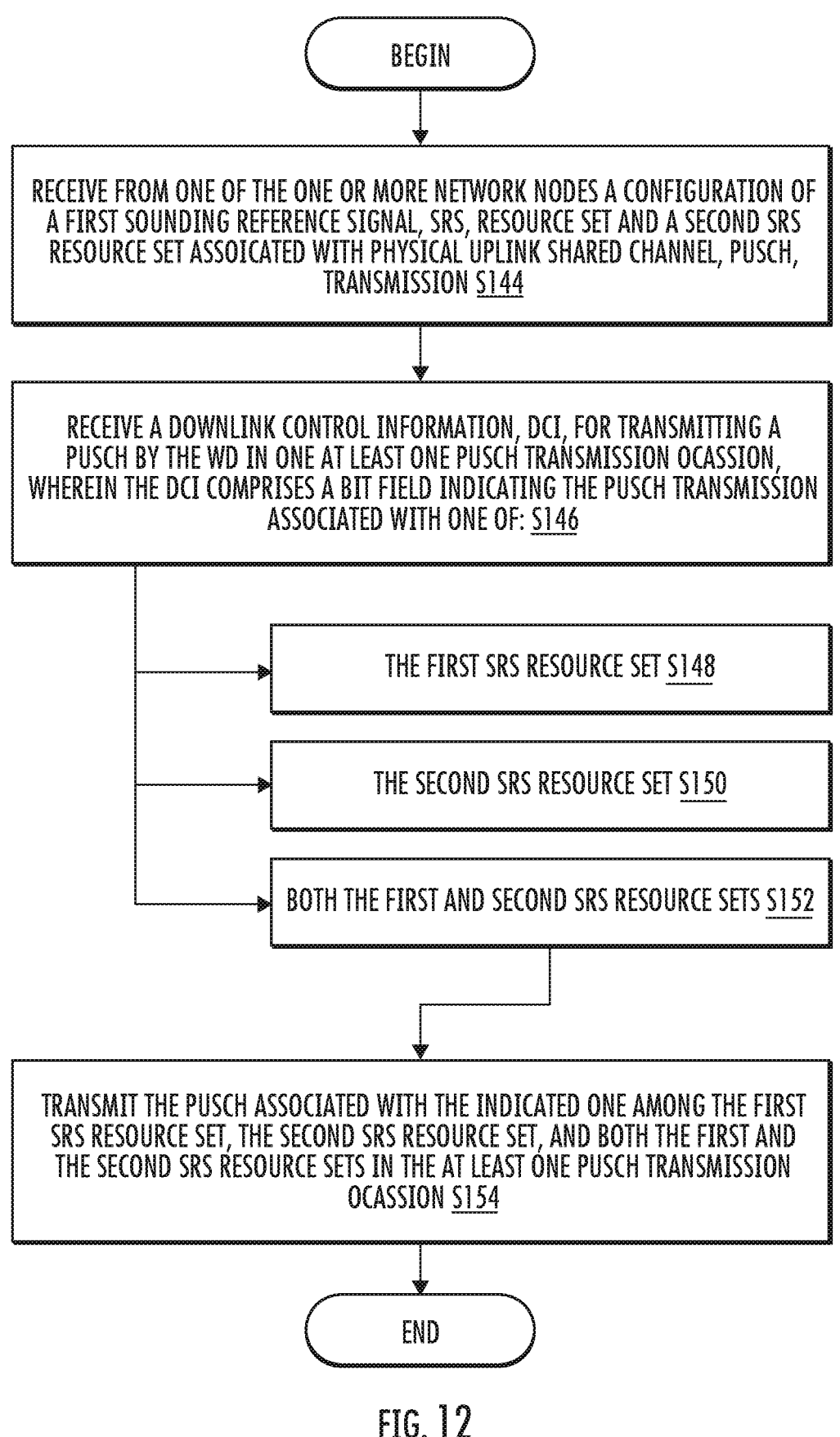
FIG. 12 is flowchart of another process in a WD according to some embodiments of the present disclosure.

FIG. 12 is a flowchart of an example process in a wireless device 22 according to some embodiments of the present disclosure. One or more blocks described herein may be performed by one or more elements of wireless device 22 such as by one or more of processing circuitry 84, processor 86, radio interface 82 and/or communication interface 60. Wireless device 22 is configured to: receive from one of the one or more network nodes a configuration of a first sounding reference signal, SRS, resource set and a second SRS resource set associated with Physical Uplink Shared Channel, PUSCH, transmission (Block S144). The method also includes receiving a downlink control information, DCI, for transmitting a PUSCH by the WD 22 in one at least one PUSCH transmission occasion, wherein the DCI comprises a bit field indicating the PUSCH transmission associated with one of (Block S146): the first SRS resource set (Block S148); the second SRS resource set (Block S150); and both the first and the second SRS resource sets (Block S152). The radio interface 82 is further configured to transmit the PUSCH associated with the indicated one among the first SRS resource set, the second SRS resource set, and both the first and the second SRS resource sets in the at least one PUSCH transmission occasion (Block S154).

According to this aspect, in some embodiments, a first codepoint of the bit field indicates the PUSCH transmission associated with the first SRS resource set, a second codepoint of the bit field indicates the PUSCH transmission associated with the second SRS resource set, and a third codepoint of the bit field indicates the PUSCH transmission associated with both the first and the second SRS resource sets. In some embodiments, the method includes transmitting the PUSCH in the at least one PUSCH transmission occasion according to one of a first and second sounding reference signal resource indicator, SRI, one of a first and second transmit precoding matrix indicator, TPMI, and one of a first and second transmit power control, TPC, command when the at least one of the first and second SRS resource set is indicated. In some embodiments, the method includes transmitting the PUSCH in at least a first transmission occasion according to one of a first sounding reference signal resource indicator, SRI, a first TPMI, and a first TPC and in a second transmission occasion(s) according to one of a second SRI, a second TPMI, and a second TPC when both the first and the second SRS resource sets are indicated by the third codepoint.

Having described the general process flow of arrangements of the disclosure and having provided examples of hardware and software arrangements for implementing the processes and functions of the disclosure, the sections below provide details and examples of arrangements for dynamic indication of physical uplink shared channel (PUSCH transmission to a single transmission/reception point (TRP) or multiple TRPs. Further, while the embodiments below are described in terms of TRPs, TRPs are described from the perspective of a network node 16 for ease of understanding. That is, one or more TRP/network node 16 functions described below may be performed by one or more of processing circuitry 68, processor 70, configuration unit 32, radio interface 62, etc., i.e., a TRP may correspond to, for example, network node 16, part of network node 16, etc., as described and defined above. However, it is noted that such description is not intended to limit embodiments only to network nodes 16. Further, one or more wireless device 22 functions described below may be performed by one or more processing circuitry 84, processor 86, TRP selection unit 34, radio interface 82, etc.

Dynamic Indication of PUSCH Transmission to a Single TRP or Multiple TRPs

Figure 13:
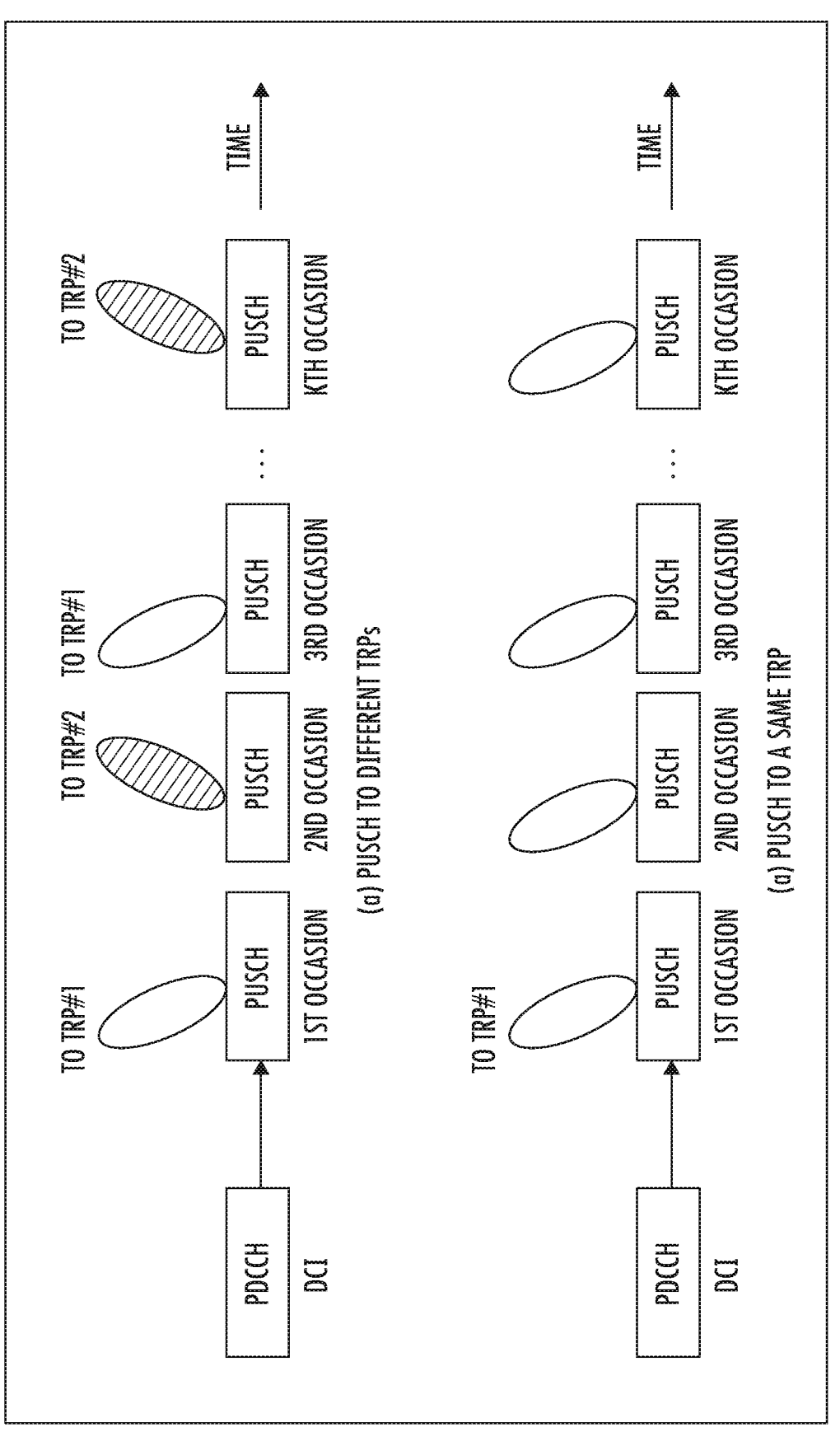
FIG. 13 is a diagram of an example of scheduling one or more PUSCH transmissions to a same or different TRP by a single DCI according to some embodiments of the present disclosure.

In this embodiment, it is assumed that a single DCI is used to schedule one or more PUSCH transmission occasions towards two TRPs. In case of multiple PUSCH transmission occasions, different occasions correspond to either a same transport block (TB) or different TBs and either towards the same TRP or different TRPs. An example is illustrated in FIG. 13.

For scheduling a PUSCH towards two TRPs, some TRP specific parameters associated with the two TRPs may be dynamically indicated in the DCI, including at least:

two SRS resource indicators (SRIs);
two TPMI and rank (e.g., number of transmission layers) indicators; and/or
two TPC commands.

There are two options to indicate the TRP specific parameters in a DCI:

Alternative.1: separate bit field for each TRP: using two fields for each TRP specific parameter/indicator, one for each TRP. An example is shown below:
First bit field for parameter 1, associated with TRP #1;
First bit field for parameter 2, associated with TRP #1;
. . .
First bit field for parameter N, associated with TRP #1;
Second bit field for parameter 1, associated with TRP #2;
Second bit field for parameter 2, associated with TRP #2;
. . .
Second bit field for parameter N, associated with TRP #2.
Alternative 2: same bit field for both TRPs: using a single field with joint encoding for each TRP specific parameter/indicator. An example is shown in Table 1.

TABLE 1

| | Parameter i | |
|---|---|---|
| Code point | TRP#1 | TRP#2 |
| 0 | value (1, 0) | value (2, 0) |
| 1 | value (1, 1) | value (2, 1) |
| . . . | . . . | . . . |
| M-1 | value (1, M-1) | value (2, M-1) |

In both alternatives, one of the design goals may be to support dynamic switching between PUSCH transmissions to a single TRP, referred to as single TRP mode, and to two TRPs, referred to as multi-TRP mode. For both single TRP and multi-TRP modes, the DCI fields as well as the size of each field may be the same. For instance, for SRI indication, the DCI may include 2 SRI fields of the same size where each field corresponds to a different TRP. The DCI may additionally contain two TPMI fields (for codebook based PUSCH transmission) with the same sizes for TPMI indication, where each field corresponds to a different TRP. The DCI may also include two TPC fields with the same sizes for TPC, where each field corresponds to different TRP.

In one embodiment, a new TRP indicator (TRPI) bit field may be introduced in a DCI to indicate whether a PUSCH is to be transmitted to TRP #1, TRP #2, or both TRPs.

When separate bit fields are used for each TRP, the TRPI field can be used to indicate whether the first bit field, the second bit field, or both the first and the second bit fields are enabled. An example is shown and described below.

A new 2 bits TRP indicator (TRPI) field:
TRPI=0: the first bit fields are enabled;
TRPI=1: the second bit fields are enabled;
TRPI=2: both the first and the second bit fields are enabled;
First bit field for parameter 1, associated with TRP #1;
First bit field for parameter 2, associated with TRP #1;
. . .
First bit field for parameter N, associated with TRP #1;
Second bit field for parameter 1, associated with TRP #2;
Second bit field for parameter 2, associated with TRP #2;
. . .
Second bit field for parameter N, associated with TRP #2.

The TRPI allows a WD 22 to skip parsing the first or the second bit fields if a PUSCH is scheduled to only one TRP.

In case a single bit field with joint encoding is used for both TRPs for a given parameter, the TPRI can also be used in indicate whether TRP #1, TRP #2, or both TRPs are applicable, i.e., which column or columns in Table 1 should be used.

In some embodiments, whether a PUSCH is to be transmitted to TRP #1, TRP #2, or both TRPs is indicated implicitly via a reserved vs non-reserved codepoint indication in a field. To indicate that a bit field associated with a given TRP is disabled, some codepoints in that bit field may be reserved, and when a reserved codepoint is indicated in that bit field that particular bit field is disabled (i.e., there is no PUSCH transmission towards the TRP corresponding to that bit field).

In one example embodiment, the SRI field may contain at least one reserved codepoint where no SRIs are mapped to the reserved codepoint. Consider the following first example which indicates that PUSCH is transmitted towards only TRP #1:

First bit field for SRI, associated with TRP #1, indicates a non-reserved codepoint which is mapped to one or more SRIs. This means that the First bit field for SRI is enabled, and there is PUSCH transmission towards TRP #1; and
Second bit field for SRI, associated with TRP #2, indicates a reserved codepoint which is not mapped to any SRIs. This means that the Second bit field for SRI is disabled, and there is no PUSCH transmission towards TRP #2.

In the second example given below, PUSCH is transmitted towards TRP #2"

First bit field for SRI, associated with TRP #1, indicates a reserved codepoint which is not mapped to any SRIs. This means that the First bit field for SRI is disabled, and there is no PUSCH transmission towards TRP #1; and
Second bit field for SRI, associated with TRP #2, indicates a non-reserved codepoint which is mapped to one or more SRIs. This means that the Second bit field for SRI is enabled, and there is PUSCH transmission towards TRP #2.

In the third example given below, PUSCH is transmitted towards both TRP #1 and TRP #2:

First bit field for SRI, associated with TRP #1, indicates a non-reserved codepoint which is mapped to one or more SRIs. This means that the First bit field for SRI is enabled, and there is PUSCH transmission towards TRP #1; and Second bit field for SRI, associated with TRP #2, indicates a non-reserved codepoint which is mapped to one or more SRIs. This means that the Second bit field for SRI is enabled, and there is PUSCH transmission towards TRP #2.

In some embodiments, if an SRI field is disabled, then the corresponding TPMI and/or TPC fields are also disabled.

In another example embodiment, the TPMI field may contain at least one reserved codepoint where no TPMIs are mapped to the reserved codepoint. Consider the following first example which indicates that PUSCH is transmitted towards only TRP #1:

First bit field for TPMI, associated with TRP #1, indicates a non-reserved codepoint which is mapped to one or more TPMIs. This means that the First bit field for TPMI is enabled, and there is PUSCH transmission towards TRP #1; and Second bit field for TPMI, associated with TRP #2, indicates a reserved codepoint which is not mapped to any TPMIs. This means that the Second bit field for TPMI is disabled, and there is no PUSCH transmission towards TRP #2.

In the second example given below, PUSCH is transmitted towards TRP #2:

First bit field for TPMI, associated with TRP #1, indicates a reserved codepoint which is not mapped to any TPMIs. This means that the First bit field for TPMI is disabled, and there is no PUSCH transmission towards TRP #1; and Second bit field for TPMI, associated with TRP #2, indicates a non-reserved codepoint which is mapped to one or more TPMIs. This means that the Second bit field for TPMI is enabled, and there is PUSCH transmission towards TRP #2.

In the third example given below, PUSCH is transmitted towards both TRP #1 and TRP #2:

First bit field for TPMI, associated with TRP #1, indicates a non-reserved codepoint which is mapped to one or more TPMIs. This means that the First bit field for TPMI is enabled, and there is PUSCH transmission towards TRP #1; and Second bit field for TPMI, associated with TRP #2, indicates a non-reserved codepoint which is mapped to one or more TPMIs. This means that the Second bit field for TPMI is enabled, and there is PUSCH transmission towards TRP #2.

In some embodiment, if an TPMI field is disabled, then the corresponding SRI and/or TPC fields are also disabled.

In another example embodiment, the TPC field may contain at least one reserved codepoint where no TPCs are mapped to the reserved codepoint. Consider the following first example which indicates that PUSCH is transmitted towards only TRP #1:

First bit field for TPC, associated with TRP #1, indicates a non-reserved codepoint which is mapped to one or more TPCs. This means that the First bit field for TPC is enabled, and there is PUSCH transmission towards TRP #1; and Second bit field for TPC, associated with TRP #2, indicates a reserved codepoint which is not mapped to any TPCs. This means that the Second bit field for TPC is disabled, and there is no PUSCH transmission towards TRP #2.

In the second example given below, PUSCH is transmitted towards TRP #2:

First bit field for TPC, associated with TRP #1, indicates a reserved codepoint which is not mapped to any TPCs. This means that the First bit field for TPC is disabled, and there is no PUSCH transmission towards TRP #1; and Second bit field for TPC, associated with TRP #2, indicates a non-reserved codepoint which is mapped to one or more TPCs. This means that the Second bit field for TPC is enabled, and there is PUSCH transmission towards TRP #2.

In the third example given below, PUSCH is transmitted towards both TRP #1 and TRP #2:

First bit field for TPC, associated with TRP #1, indicates a non-reserved codepoint which is mapped to one or more TPCs. This means that the First bit field for TPC is enabled, and there is PUSCH transmission towards TRP #1; and Second bit field for TPC, associated with TRP #2, indicates a non-reserved codepoint which is mapped to one or more TPCs. This means that the Second bit field for TPC is enabled, and there is PUSCH transmission towards TRP #2.

In some embodiments, if an TPC field is disabled, then the corresponding SRI and/or TPC fields are also disabled.

The above embodiments related to reserved codepoint fields can also be extended to the case where one field is use to jointly indicate the parameters corresponding to two TRPs. An example is given below in Table 2. In the below example, codepoint 0 corresponds to PUSCH transmission towards TRP #1 only. Codepoint 1 corresponds to PUSCH transmission towards TRP #2 only. Codepoint 2 corresponds to PUSCH transmission towards TRP #1 and #2.

TABLE 2

| Code point | Parameter i | |
| | TRP#1 | TRP#2 |
|---|---|---|
| 0 | value (1, 0) | reserved |
| 1 | reserved | value (2, 1) |
| 2 | value (1, M-1) | value (2, M-1) |

In some embodiments, instead of using reserved codepoints, an additional bit may be included in each field. If that bit is set to one value, then the remainder of that field is disabled and PUSCH transmission towards the corresponding TRP is disabled. If that bit is set to a second value, the remainder of that field is enabled and PUSCH transmission towards the corresponding TRP is enabled.

Some Examples may include the following:

1. A method of dynamic switching between single TRP and multi-TRP PUSCH scheduling with a same DCI format in a wireless network comprising a first TRP and a second TRP and a WD 22, the method comprising:

configuring, by a network node 16, a WD 22 with a first and a second SRS resource sets associated with the first and the second TRPs, respectively;

scheduling a PUSCH transmission by a DCI containing a TRP indicator (TRPI), at least one of a first and a second SRS resource indicator, SRI, a first and a second transmit precoding matric indicators, TPMIs, indicators, and a first and a second transmit power control commands, TPCs; and transmitting the PUSCH to a first TRP, a second TRP, or both the first and the second TRPs according to the TRPI, the first and the second SRIs, TMPIs, and TPCs.

2. The method of Example 1, where the TRPI indicates whether the first, the second, or both first and the second SRIs, TMPIs, and TPCs are applicable for the PUSCH.

3. The method of Example 1, where the TRPI may be encoded as:

TRPI=0: the first SRI, TMPI, and TPC are enabled and applicable;

TRPI=1: the second SRI, TMPI, and TPC are enabled and applicable;

TRPI=2: both the first and the second SRIs, TMPIs, and TPCs are enabled and applicable.

4. The method of 1, where the TRPI is in a separate bit field in DCI.

5. The method of 1, where the first and the second SRIs, TMPIs, and TPCs are in different bit fields in the DCI.

6. The method of Example 1, where the first and the second SRIs, TMPIs, or TPCs are jointly encoded in a single bit field in the DCI.

7. The method of Example 1, where the TRPI is a codepoint in one or more of the SRI, TPMI, and TPC fields.

According to one aspect, a network node 16 is configured to communicate with a wireless device (WD). The network node 16 includes a radio interface 62 and/or comprising processing circuitry 68 configured to: configure a WD 22 with a first sounding reference signal (SRS) set associated with a first transmission/reception point (TRP) and with a second SRS associated with a second TRP; and configure the WD 22 to schedule a physical uplink shared channel (PUSCH) transmission to the first TRP or the second TRP, or to both the first TRP and second TRP.

According to this aspect, in some embodiments, the WD 22 is further configured to schedule the PUSCH by a field in downlink control information (DCI) that indicates to the WD 22 which of one or more TRPs are to receive the PUSCH from the WD 22. In some embodiments, the DCI that schedules the PUSCH includes a sounding reference signal resource indicator (SRI) for each of the one or more TRPs. In some embodiments, the DCI that schedules the PUSCH includes a transmit precoder matrix indication (TPMI) for each of the one or more TRPs. In some embodiments, the DCI that schedules the PUSCH includes a transmit power control (TPC) command for each of the one or more TRPs. In some embodiments, a TRP indicator (TRPI) is a codepoint in one or more of the SRI, the TPMI, and/or the TPC.

According to another aspect, a method implemented in a network node 16 includes configuring a WD 22 with a first sounding reference signal (SRS) set associated with a first transmission/reception point (TRP) and with a second SRS associated with a second TRP, and configuring the WD 22 to schedule a physical uplink shared channel (PUSCH) transmission to the first TRP or the second TRP, or to both the first TRP and second TRP.

According to this aspect, in some embodiments, the WD 22 is further configured to schedule the PUSCH by a field in downlink control information (DCI) that indicates to the WD 22 which of one or more TRPs are to receive the PUSCH from the WD 22. In some embodiments, the DCI that schedules the PUSCH includes a sounding reference signal resource indicator (SRI) for each of the one or more TRPs. In some embodiments, the DCI that schedules the PUSCH includes a transmit precoder matrix indication (TPMI) for each of the one or more TRPs. In some embodiments, the DCI that schedules the PUSCH includes a transmit power control (TPC) command for each of the one or more TRPs. In some embodiments, a TRP indicator (TRPI) is a codepoint in one or more of the SRI, the TPMI, and/or the TPC.

According to yet another aspect, a WD 22 is configured to communicate with a plurality of network node 16, the WD 22 configured to, and/or comprising a radio interface 82 and/or processing circuitry 84 configured to select one or more transmission/reception points (TRP) to which to transmit a physical uplink shared channel (PUSCH) transmission, the TRPs being selected according to downlink control information (DCI) received from a network node 16.

According to this aspect, in some embodiments, the WD 22, radio interface 82 and/or processing circuitry 84 are further configured transmit to each selected TRP a different one of the following: a sounding reference signal indicator (SRI), a transmit precoder matrix indicator (TPMI) and/or a transmit power control (TPC) command. In some embodiments, the DCI selects whether transmission by the WD 22 is to a first TRP, a second TRP or to both the first and second TRP.

According to another aspect, a method implemented in a wireless device (WD) 22 includes selecting one or more transmission/reception points (TRP) to which to transmit a physical uplink shared channel (PUSCH) transmission, the TRPs being selected according to downlink control information (DCI) received from a network node 16.

According to this aspect, in some embodiments, the method further includes transmitting to each selected TRP a different one of the following: a sounding reference signal indicator (SRI), a transmit precoder matrix indicator (TPMI) and/or a transmit power control (TPC) command. In some embodiments, the DCI selects whether transmission by the WD 22 is to a first TRP, a second TRP or to both the first and second TRP.

Some Examples may include one or more of the following:

Example A1. A network node 16 configured to communicate with a wireless device 22 (WD 22), the network node 16 configured to, and/or comprising a radio interface 62 and/or comprising processing circuitry 68 configured to:

configure a WD 22 with a first sounding reference signal (SRS) set associated with a first transmission/reception point (TRP) and with a second SRS associated with a second TRP; and configure the WD 22 to schedule a physical uplink shared channel (PUSCH) transmission to the first TRP or the second TRP, or to both the first TRP and second TRP.

Example A2. The network node 16 of Example A1, wherein the WD 22 is further configured by the network node to schedule the PUSCH by a field in downlink control information (DCI) that indicates to the WD 22 which of one or more TRPs are to receive the PUSCH from the WD 22.

Example A3. The network node 16 of Example A2, wherein the DCI that schedules the PUSCH includes a sounding reference signal resource indicator (SRI) for each of the one or more TRPs.

Example A4. The network node 16 of Example A2, wherein the DCI that schedules the PUSCH includes a transmit precoder matrix indication (TPMI) for each of the one or more TRPs.

Example A5. The network node 16 of Example A2, wherein the DCI that schedules the PUSCH includes a transmit power control (TPC) command for each of the one or more TRPs.

Example A6. The network node 16 of Example A2-A5, wherein a TRP indicator (TRPI) is a codepoint in one or more of the SRI, the TPMI, and/or the TPC.

Example B1. A method implemented in a network node 16, the method comprising:

configuring a WD 22 with a first sounding reference signal (SRS) set associated with a first transmission/reception point (TRP) and with a second SRS associated with a second TRP; and configuring the WD 22 to schedule a physical uplink shared channel (PUSCH) transmission to the first TRP or the second TRP, or to both the first TRP and second TRP.

Example B2. The method of Example B1, wherein the WD 22 is further configured to schedule the PUSCH by a field in downlink control information (DCI) that indicates to the WD 22 which of one or more TRPs are to receive the PUSCH from the WD 22.

Example B3. The method of Example B2, wherein the DCI that schedules the PUSCH includes a sounding reference signal resource indicator (SRI) for each of the one or more TRPs.

Example B4. The method of Example B2, wherein the DCI that schedules the PUSCH includes a transmit precoder matrix indication (TPMI) for each of the one or more TRPs.

Example B5. The method of Example B2, wherein the DCI that schedules the PUSCH includes a transmit power control (TPC) command for each of the one or more TRPs.

Example B6. The method of Example B2-B5, wherein a TRP indicator (TRPI) is a codepoint in one or more of the SRI, the TPMI, and/or the TPC.

Example C1. A wireless device 22 (WD 22) configured to communicate with a plurality of network node 16, the WD 22 configured to, and/or comprising a radio interface 82 and/or processing circuitry 84 configured to;

select one or more transmission/reception points (TRP) to which to transmit a physical uplink shared channel (PUSCH) transmission, the TRPs being selected according to downlink control information (DCI) received from a network node 16.

Example C2. The WD 22 of Example C1, wherein the WD 22, radio interface 82 and/or processing circuitry 84 are further configured transmit to each selected TRP a different one of the following: a sounding reference signal indicator (SRI), a transmit precoder matrix indicator (TPMI) and/or a transmit power control (TPC) command.

Example C3. The WD 22 of Example C1, wherein the DCI selects whether transmission by the WD 22 is to a first TRP, a second TRP or to both the first and second TRP.

Example D1. A method implemented in a wireless device 22 (WD 22), the method comprising:

selecting one or more transmission/reception points (TRP) to which to transmit a physical uplink shared channel (PUSCH) transmission, the TRPs being selected according to downlink control information (DCI) received from a network node 16.

Example D2. The method of Example D1, further comprising transmitting to each selected TRP a different one of the following: a sounding reference signal indicator (SRI), a transmit precoder matrix indicator (TPMI) and/or a transmit power control (TPC) command.

Example D3. The method of Example D1, wherein the DCI selects whether transmission by the WD 22 is to a first TRP, a second TRP or to both the first and second TRP.

Some embodiments are discussed further below in reference to 3GPP standards:

In RAN1 #103e, PDCCH, PUSCH, and PUCCH enhancements with multi-TRP in NR Rel-17 were further discussed and some agreements have been made. Many details are to be further studied.

Various design details on PDCCH, PUSCH, and PUCCH enhancements for multi-TRP are disclosed herein:

For PDCCH reliability enhancements, support SFN scheme+Alt 1-1.

For Further Study (FFS): TCI state activation for CORESET, impact on default beam, BFD resource for BFR.

For PDCCH reliability enhancements with non-SFN schemes, support at least Option 2+Case 1;

Maximum number of linked PDCCH candidates is two;

FFS: Details including how the two PDCCH candidates are counted toward the BD limits and impact on overbooking, if any;

Down-select at least one Alt from Alts 1-2/1-3/2/3;

FFS: Linking options such as a fixed rule based on the same PDCCH candidate index, based on start CCE, based on configuration, etc.:

FFS: additional restriction to facilitate soft combining;

FFS: implicit PUCCH resource determination for >8 PUCCH resources in the resource set, scheduling offset for "timeDurationForQCL", Out-of-order/in-order definition for PDCCH-to-PDSCH and PDCCH-to-PUSCH, DAI for Type-2 codebook, Slot offset for scheduling the same PDSCH/PUSCH/CSI-RS/SRS, rate matching PDSCH around the scheduling DCI;

FFS: whether and how to support for DCI format 2_x.

FFS: whether and how to support for DCI format 2

For PDCCH reliability enhancements with non-SFN schemes and Option 2+Case 1, support Alt3 (two SS sets associated with corresponding CORESETs).

PDCCH Enhancements

In the last RAN1 meeting, the following agreements were reached on PDCCH enhancements. In this sub-section, the remaining issues are disclosed.

Regarding Alts 1-2/1-3/2/3 and the working assumption:

In this section the different alternatives/options for non-SFN PDCCH repetition are disclosed.

In Alt.1-2, a CORESET is activated with two TCI states and is associated with a SS set. One possibility is to associate different PDCCH candidates with different TCI states and a PDCCH is repeated in two PDCCH candidates associated with different TCI states. Due to the existing way of CCE based resource allocation (i.e. mapping to REs) for PDCCH, FDM will be the resulting mapping between PDCCHs when transmitting two PDCCH candidates from two TRPs.

To support PDCCH with multi-TRP enhancements in FR2, TDM mapping is required and in order to support this, changes are required so that a PDCCH candidate could be located within only one OFDM symbol of a CORESET configured with multiple symbols. The changes would be a major deviation from the existing CCE based PDCCH allocation.

With Alt.1-2, PDCCH candidates are effectively FDM:ed and cannot be used in FR2. Changes on existing CCE based PDCCH resource allocation may needed to support TDM.

In Alt.1-3, a CORESET is activated with two TCI states and is associated with two SS sets. One possibility is to associate different PDCCH candidates with different TCI states and allocate PDCCH candidates with the same TCI state to the same SS set. A PDCCH is then repeated in two PDCCH candidates associated with different TCI states or SS sets. Again, due to the existing way of CCE based resource allocation for PDCCH candidates, FDM will be the resulting mapping between PDCCHs for transmitting two PDCCH candidates from two TRPs. The associated SS sets can potentially have different configurations such as periodicity/slot offsets, monitoring pattern in a slot, etc. However, the benefit of such flexibility is unclear.

With Alt.1-3, PDCCH candidates are effectively FDM:ed and cannot be used in FR2. The benefit of the additional flexibility enabled by Alt.1-3 is unclear.

Between Alt.2 and Alt.3, the required spec changes are rather similar. In Alt.2, spec change is needed to allow a SS set to be associated with two CORESETs, while in Alt.3, spec change is required to link two SS sets.

With Alt.3, the two linked SS sets could have different configurations on monitoring periodicity/slot offset, monitoring pattern within slot, duration, and number of PDCCH candidates for each aggregation level. For example, if one SS set is configured with 2 PDCCH candidates, and the other linked SS set is configured with 4 PDCCH candidates for a given aggregation level, how to link the PDCCH candidates in the 2 SS sets would be an unclear issue.

In another example, if one SS set is configured with one monitoring occasion while the other SS set is configured with 2 monitoring occasions in a slot, how to link PDCCH candidates in the 2 SS sets is yet another issue. Thus, additional constraints may be needed to avoid dealing with too many combinations. There are no such unclear issues with Alt.2.

However, given the majority support of Alt.3, there should be support to confirm the working assumption.

Confirm the working assumption for PDCCH reliability enhancements with non-SFN schemes and Option 2+Case 1, i.e. support Alt3 (two SS sets associated with corresponding CORESETs).

Maximum Number of Linked PDCCH Candidates

An open issue is the maximum number of PDCCH candidate that are linked, i.e., the number of repetitions of a PDCCH. In one view, two repetitions of the PDCCH is the baseline and should be the default, there has been consideration of whether to have a higher number as a WD capability if benefits can be clearly shown.

When PDCCH repetition is enabled for the WD 22, the default is that two PDCCH candidates are linked. FFS whether more than two can be configured to be linked.

Blind Decoding Limit

In one 3GPP meeting, the discussion revolved around the following alternatives:

Assumption 1: WD 22 only decodes the combined candidate without decoding individual PDCCH candidates;

Assumption 2: WD 22 decodes individual PDCCH candidates;

Assumption 3: WD 22 decodes the first PDCCH candidate and the combined candidate;

Assumption 4: WD 22 decodes each PDCCH candidate individually, and also decodes the combined candidate.

There was a discussion in the 3GPP meeting related to assumption 1, that it is more processing heavy for the WD 22 to combine the candidates and therefore the number of BD for assumption 1 was argued to be counted as larger than one. However, as the number of BD is still one for this case, one might not extend the definition of a BD to also include other processing demands (outside the actual blind decoding operation) for the WD 22. Hence, it may be useful to maintain the number of BD for these for assumptions as 1, 2, 2 and 3 respectively.

Nevertheless, there is support counting two BD to decode a PDCCH candidate when it is linked with another candidate. There may be further consideration of whether to specify which assumption the WD 22 is using or if that is up to WD 22 implementation only.

Two blind decodes per PDCCH pair is counted towards BD limit for the WD 22 when the PDCCH consists of two PDCCH candidates that are linked.

Determining PUCCH Resource

From the previous meeting, the following alternatives may be considered:

Alt 1: Ensure same start CCE index (based on linking options) and the same number of CCEs in the two CORESETs (based on CORESET configuration restriction);

Alt 2: Starting CCE index and number of CCEs in the CORESET of one of the linked PDCCH candidates is applied;

FFS: Which one of the linked PDCCH candidates is used.

Alt 3: It is up to the WD 22 to determine the PUCCH resource based on the starting CCE index and number of CCEs in the CORESET of any of the two linked PDCCH candidates.

Other alternatives are not precluded.

Currently, when the number of PUCCH resources, $R_{PUCCH}$, in the first set of PUCCH resources is larger than eight, the WD 22 determines a PUCCH resource with index $r_{PUCCH}$, $0 \leq r_{PUCCH} \leq R_{PUCCH}-1$, for carrying HARQ-ACK information as $$r_{PUCCH} = \begin{cases} \left\lfloor \frac{N_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{N_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil + R_{PUCCH} \bmod 8 & \text{if } \Delta_{PRI} \geq R_{PUCCH} \bmod 8 \end{cases}$$

where $N_{CCE,p}$ is a number of CCEs in CORESET p over which a last DCI among DCIs the WD received with PUCCH transmission in a same slot, $n_{CCE,p}$ is the index of a first CCE for the PDCCH reception, and $\Delta_{PRI}$ is a value of the PUCCH resource indicator field in the last DCI.

In case of two linked PDCCH candidates, the indices of the first CCEs for the two PDCCH candidates are generally different. If the two PDCCHs are in two different CORESETs, the number of CCEs in the two CORESETs can also be different.

In Alt.1, the same number of CCEs are required for the two CORESETS, which may be reasonable. In addition, the linked PDCCH candidates also need to have the same the starting CCE index, which requires a new mapping between a PDCCH candidate and CCEs.

In Alt.3, depending on WD implementation, two different PUCCH resources could be selected by different WDs 22, gNB then may need to perform blind detection in two PUCCH resources, which may not be desirable and also wastes PUCCH resources.

In Alt.2, the PUCCH resource is based on the first CCE index of one of the linked PDCCH candidates and the number of CCEs of the corresponding CORESET, which is more flexible and does not require any change of PDCCH candidate mapping. The PDCCH candidate used for the determination may be the one in a CORESET with the smallest controlResourceSetId or in a SS set with the smallest searchSpaceId among the linked SS sets.
Proposal:

Support Alt.2 and use one of the linked PDCCH candidates in a CORESET having the lowest controlResourceSetId or a SS set with lowest searchSpaceId in the linked SS sets.
PDCCH Detection Time Reference Another open issue is how to define PDCCH detection time in determining the scheduling offset as mentioned in the following FFS item:

FFS: implicit PUCCH resource determination for >8 PUCCH resources in the resource set, scheduling offset for "timeDurationForQCL", Out-of-order/in-order definition for PDCCH-to-PDSCH and PDCCH-to-PUSCH, DAI for Type-2 codebook, Slot offset for scheduling the same PDSCH/PUSCH/CSI-RS/SRS, rate matching PDSCH around the scheduling DCI.

There are several scenarios where the last symbol of a PDCCH is used by a WD 22 for determining proper actions. Some examples include:

For out of order detection, "For any two HARQ process IDs in a given scheduled cell, if the WD is scheduled to start receiving a first PDSCH starting in symbol j by a PDCCH ending in symbol i, the WD is not expected to be scheduled to receive a PDSCH starting earlier than the end of the first PDSCH with a PDCCH that ends later than symbol i."

Currently, for every PDSCH scheduled by a DCI, a WD 22 determines if the time offset between the reception of the DCI and the corresponding PDSCH is less than, equal to, or greater than a threshold timeDurationForQCL. Different actions may be taken by the WD 22 accordingly.

For aperiodic CSI-RS triggering by a DCI, a WD 22 determines if the scheduling offset between the last symbol of the PDCCH carrying the triggering DCI and the first symbol of the aperiodic CSI-RS resources in a NZP-CSI-RS-ResourceSet configured without higher layer parameter trs-Info is less than, equal to, or greater than a threshold beamSwitchTiming+d·$2^{\mu_{CSIRS}}/2^{\mu_{PDCCH}}$. Different actions may be taken by the WD 22 accordingly.

For PUSCH scheduling, "A WD is not expected to be scheduled by a PDCCH ending in symbol i to transmit a PUSCH on a given serving cell overlapping in time with a transmission occasion, where the WD is allowed to transmit a PUSCH with configured grant according to [3GPP TS 38.321], starting in a symbol j on the same serving cell if the end of symbol i is not at least $N_2$ symbols before the beginning of symbol j."

Therefore, for PDCCH repetition in two PDCCH candidates, the last PDCCH symbol needs to be clearly defined. In one view, the last symbol should be the last symbol of the PDCCH candidate (or the associated monitoring occasion) occurring later in time among the linked PDCCH candidates as shown in FIG. 14.

Figure 14:
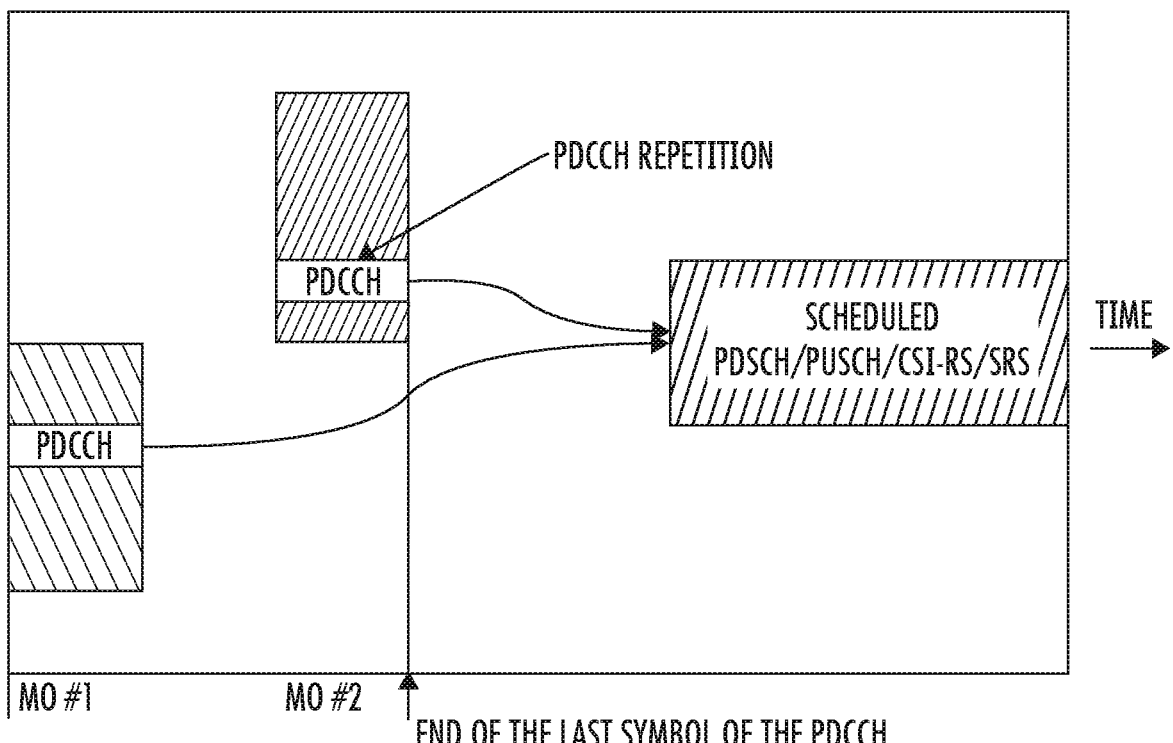
FIG. 14 is a diagram of PDCCHs according to some embodiments of the present disclosure.

FIG. 14 is a proposal of defining the last symbol of the linked PDCCH candidates as the end of the PDCCH.

The PDCCH symbol occurring latest in time in a pair of linked PDCCH candidates is defined as the last symbol regardless of which PDCCH candidate(s) the WD actually have detected.
DAI for Type 2 HARQ Codebook Another issue is how to construct a type 2 HARQ Ack codebook in case of PDCCH repetition. In type 2 HARQ-ACK codebook, counter DAI and total DAI in DCIs are used to order HARQ-ACK information bits and to detect possible missing DCI(s). The value of the counter DAI denotes the accumulative number of {serving cell, PDCCH monitoring occasion}-pair(s) in which PDSCH reception(s) or SPS PDSCH release associated with the DCIs is present up to the current serving cell c and current PDCCH monitoring occasion m. The value of the total DAI denotes the total number of {serving cell, PDCCH monitoring occasion}-pair(s) in which PDSCH reception(s) or SPS PDSCH release associated with the DCIs is present, up to the current PDCCH monitoring occasion m and is updated from PDCCH monitoring occasion to PDCCH monitoring occasion.

In case of PDCCH repetition, it is logical that the counter DAI is incremented only at the first time the PDCCH is transmitted (i.e., the first PDCCH occasion in a first PDCCH monitoring occasion m1) and the same DAI value is also used in the PDCCH repetition (i.e., the second PDCCH occasion in a second PDCCH monitoring occasion m2, where m2≥m1).

Therefore, the HARQ-ACK position should be determined based on the first PDCCH occasion in PDCCH monitoring occasion m1 regardless whether the PDCCH is detected in the first or/and the second PDCCH occasion. To construct the type 2 HARQ-ACK codebook, the first PDCCH occasions and the associated PDCCH monitoring occasions should be identified for all detected PDCCHs having a counter DAI field in the corresponding DCIs. Then the existing procedure for HARQ-ACK codebook construction is applied only for the first PDCCH occasions in case of PDCCH repetition.

The DAI counter DAI is incremented only at the first time a PDCCH is transmitted (i.e., at the first PDCCH occasion) in a linked pair of PDCCH candidates.

The existing procedure for type 2 HARQ-ACK codebook construction is applied only for the first PDCCH occasion in case of PDCCH repetition regardless whether the PDCCH is actually detected in the first or/and the second PDCCH occasion.
Rate Matching Around PDCCH Candidates An open issue is the rate matching around PDCCH candidates in case the whole CORESET is not configured as unavailable for PDSCH. It may be straightforward to support rate matching around the union of the linked PDCCH candidates in this case.

In case the CORESET is not configured as unavailable for PDSCH and if a PDSCH scheduled by a pair of PDCCHs overlap with resources in the CORESETs containing the PDCCHs, PDSCH rate matching is done around the union of the linked PDCCH candidates and corresponding DM-RS.
Support of Common DCI Format 2_x For PUSCH with type 1 or type 2 CGs, closed-loop power control can solely depend on DCI format 2_2 for receiving TPS commands. Since CGs are likely used for URLLC type of traffic, reliable closed-loop power control is needed.

Similarly, closed-loop power control for SRS also depends on timely and reliable decoding of DCI format 2_3. Therefore, it seems to make sense that PDCCH enhancements can also be supported for DCI formats 2_2 and 2_3.

DCI Format 2-2/2-3 are Also Supported by Multi-TRP Based PDCCH Enhancements

Impact of CORESET Activated with Two TCI States for SFN

Another open issue is how to activate a CORESET with two TCI states and how to determine the default TCI state when the CORESET has a lowest CORESET ID in a slot as mentioned in the following FFS item:

FFS: TCI state activation for CORESET, impact on default beam, BFD resource for BFR.

When two TCI states are activated for a CORESET and the CORESET has the lowest CORESET ID among CORESETs in a slot monitored by a WD, one question is how to define the default TCI state(s) for a PDSCH when the time offset between the reception of a DL DCI in the slot scheduling the PDSCH and the PDSCH is less than the threshold timeDurationForQCL. There are two possible options, i.e., Option 1: only one of the two activated TCI states for the CORESET is used as the default TCI state for the PDSCH (e.g., either specified or indicated in the activation MAC CE);

Option 2: both the two activated TCI states for the CORESET are used as the default TCI states for the PDSCH if it is supported by a WD.

Note that default TCI state is also used for UL power control when pathloss RS is not configured or in link monitoring when link monitoring RS is not configured. In these cases, only one DL RS is needed. Therefore, Option 1 seems to be preferred.

One of the two activated TCI states is used as the default TCI state, FFS whether the one is specified or indicated in a MAC CE activating the TCI states.

Currently, only a single TCI state can be activated for a CORESET by a MAC CE. Therefore, a new MAC CE seems to be needed to activate two TCI states for a CORESET.

A New MAC CE is Needed to Activate 2 TCI States for a CORESET.

Intra Vs. Inter-Slot Repetition

For PDCCH repetition, intra-slot repetition is more suitable for URLLC due to its low latency. For inter-slot repetition, K0/K2 would be different in two different slots for a same scheduled PDSCH/PUSCH since the number of slots between the two PDCCHs and the schedule PDSCH/PUSCH would be different. Unless some additional changes are introduced, soft combining is no longer possible because the DCI content would be different in different slots.

Proposal: Consider finalizing PDCCH enhancement with intra-slot PDCCH repetition first.

PUSCH Enhancements

In one RAN1 meeting, the following was discussed on PUSCH enhancements. In this sub-section, some remaining issues are presented.

For single DCI based M-TRP PUSCH repetition schemes, support codebook based PUSCH transmission with following enhancements.

Support the indication of two SRIs:
Alt1: Bit field of SRI shall be enhanced;
Alt2: No changes on SRI field;
Support the indication of two TPMIs:
The same number of layers are applied for both TPMIs if two TPMIs are indicated;

The number of SRS ports between two TRPs should be same;
FFS: Details on indicating two TPMIs (e.g., one TPMI field or two TPMI fields);
Increase the maximum number of SRS resource sets to two;
FFS: configuration details of each SRS resource set (e.g., number of SRS resources in a resource set).
For single DCI based M-TRP PUSCH repetition schemes, support non-codebook based PUSCH transmission with following considerations:
Increase the maximum number of SRS resource sets to two, and associated CSI-RS resource can be configured per SRS resource set;
FFS: Enhancements on SRI field in DCI to indicate the two beams for repetitions.
For single DCI based M-TRP PUSCH repetition Type B, at least nominal repetitions are used to map beams:
Further study details and applicability of each mapping method;
Further study the slot based beam mapping in the cases of nominal repetition across slot boundaries.
For PUSCH multi-TRP enhancements:
For per TRP closed-loop power control for PUSCH, further study the following alternatives when the "closedLoopIndex" values are different:
Option.1: A single TPC field is used in DCI formats 0_1/0_2, and the TPC value applied for both PUSCH beams;
Option.2: A single TPC field is used in DCI formats 0_1/0_2, and the TPC value applied for one of two PUSCH beams at a slot;
Option 3: A second TPC field is added in DCI formats 0_1/0_2;
Option 4: A single TPC field is used in DCI formats 0_1/0_2, and indicates two TPC values applied to two PUSCH beams, respectively.
FFS: Transition period for beam/power/frequency change.
Support both type 1 and type 2 CG PUSCH transmission towards MTRP. Further study the following alternatives:
Alt.1: single CG configuration:
Repetitions of a TB transmitted towards MTPR on multiple PUSCH transmission occasions of single CG configuration;
At least for codebook-based CG PUSCH, support configuring 2 SRIs/TPMIs;
Alt.2: multiple CG configurations:
Repetitions of a TB transmitted towards MTRP on more than one PUSCH transmission occasions, where one or more transmission occasions are from one CG configuration and another one or more PUSCH transmission occasions are from another CG configuration;
1 SRI/TPMI is configured/indicated for each CG configuration;
Further study required beam mapping principals, low overhead mechanisms for beam selection, and other enhancements for Alt.1 and Alt.2.
For M-TRP PUSCH reliability enhancement, further discuss multi-DCI based PUSCH transmission/repetition scheme(s) considering the following aspects:
The same TB is repeated towards multiple TRPs with different beams, where one or more PUSCH repetitions are scheduled by one DCI and another one or more PUSCH repetitions are scheduled by another DCI;

FFS: Details related to timeline restrictions and beam mapping;

Changes on Rel-15/16 MCS, TBS determination, and UL resource allocation are not expected from this scheme;

The scheme is considered to be supported only if there are gains over single DCI based PUSCH repetition schemes and a similar scheme is not supported by m-TRP PDCCH (e.g., Option 3).

Companies are encouraged to provide simulation results to decide the support of the scheme in next RAN1 meetings. The support of multi-DCI based PUSCH transmission/repetition scheme(s) in 3GPP Rel-17 may be decided in RAN1 #104-e.

For single DCI based PUSCH multi-TRP enhancements, support the following RV mapping for PUSCH repetition Type A:

DCI indicates the first RV for the first PUSCH repetition, and the RV pattern (0 2 3 1) is applied separately to PUSCH repetitions of different TRPs with a possibility of configuring RV offset for the starting RV for the second TRP (The same method as PDSCH scheme 4);

FFS: Reuse of the same method for PUSCH repetition Type B.

For single DCI based M-TRP PUSCH repetition Type A and B, further study required enhancements on PTRS-DMRS association.

For single DCI based M-TRP PUSCH repetition Type A and B, it is possible to configure either cyclic mapping or sequential mapping of UL beams:

The support of cyclic mapping can be optional WD feature for the cases when the number of repetitions is larger than 2;

FFS: Support of half-half mapping;

FFS: Additional considerations on mapping patterns (including required beam switching gaps);

Companies are encouraged to provide further simulation results to decide details.

Indication of Two SRIs

In one 3GPP meeting, it was agreed that two SRS resource sets, one for each TRP, will be supported and two SRIs will be introduced, each indicating one or more SRS resources in one of the two SRS resource sets. Two alternatives were proposed below:

Alt1: Bit field of SRI shall be enhanced;

Alt2: No changes on SRI field.

In RAN1 #103-e, two different approaches for how to indicate two SRIs were disclosed.

The first approach involves keeping a single SRI field and possibly increasing the number of bits in this single SRI field to indicate different combinations of one or two SRIs (i.e., to support dynamic switching between transmitting PUSCH(s) to single TRP and multiple TRPs).

The second approach involves introducing an additional SRI field in DCI so that the first SRI field indicates the SRI(s) corresponding to TRP 1 (i.e., from the first SRS resource set for codebook/non-codebook PUSCH) and the second SRI field indicates the SRI(s) corresponding to TRP 2 (i.e., from the second SRS resource set for codebook/non-codebook PUSCH). In one view, it is straightforward and clean to specify two SRI fields, a first and a second SRI field, for supporting two SRIs with minimum standardization effort.

For codebook/non-codebook based multi-TRP PUSCH, support two separate SRI fields in DCI, where the first SRI field indicates the SRI(s) corresponding to the first TRP and the second SRI field indicates the SRI(s) corresponding to the second TRP.

Indication of Two TPMIs

It was agreed in the 3GPP meeting to support two TPMIs, an open question is whether one or two TPMI fields should be supported to indicate the two TMPIs as mentioned in the FFS item below:

FFS: Details on indicating two TPMIs (e.g., one TPMI field or two TPMI fields)

There are two approaches to indicating two TPMIs. The first approach involves keeping a single TPMI field and possibly increasing the number of bits in this single TPMI field to indicate different combinations of one or two TPMIs (i.e., to support dynamic switching between transmitting PUSCH(s) to single TRP and multiple TRPs).

The second approach involves introducing an additional TPMI field in DCI so that the first TPMI field indicates the TPMI corresponding to TRP 1 and the second TPMI field indicates the TPMI corresponding to TRP 2. It was further agreed in RAN1 #103e that 'The same number of layers are applied for both TPMIs if two TPMIs are indicated'. Hence, when two TPMI fields are introduced, the number of layers indicated in the two TPMI fields need to be identical.

For codebook based multi-TRP PUSCH, support two separate TPMI fields in DCI, where the first TPMI field indicates the TPMI corresponding to the first TRP and the second TPMI field indicates the TPMI corresponding to the second TRP. The number of layers indicated in the first TPMI field and the second TPMI field are the same.

TPC Indication

For closed loop power control associated with multiple TRPs, the following options were proposed in the last RAN1 meeting:

Option 1: A single TPC field is used in DCI formats 0_1/0_2, and the TPC value applied for both PUSCH beams;

Option 2: A single TPC field is used in DCI formats 0_1/0_2, and the TPC value applied for one of two PUSCH beams at a slot;

Option 3: A second TPC field is added in DCI formats 0_1/0_2;

Option 4: A single TPC field is used in DCI formats 0_1/0_2, and indicates two TPC values applied to two PUSCH beams, respectively.

In Option 1, a same TPC command is applied to PUSCH transmissions to two TRPs. This assumes that the two TRPs have the same pathloss to a WD and have the same receiver noise and UL interference level, which may be true in some scenario but certainly not be true in all scenarios.

In Option 2, a TPC command is applied to only PUSCH transmissions to one of two TRPs, and closed-loop power control is not applied to the other TRP. This means that over time, the transmit power to the other TRP could drift away and could be far off from the desired receive target.

In Option 3, a second TPC field is added for a second TRP. Thus, both TRPs can be power controlled independently. This option is more flexible and with minimum standardization effort.

In Option 4, a single TPC field is used to indicate two TPC commands, one for each TRP. It has the same functionality if 2 bits are allocated for each TPC, otherwise if the goal is to have a single bit field with reduced field size, then some trade-off between the field size and number of power control steps is needed.

Comparing the four options and based on one previous discussion on supporting two SRIs and TPMIs, Option 3 may be preferred.

For per TRP closed-loop power control for PUSCH, Option 3 is supported where a second TPC field is added in DCI formats 0_1/0_2.

Dynamic Switching Between Single-TRP and Multi-TRP

In some scenarios, the WD may be served with different types of traffics (i.e., URLLC traffic vs eMBB traffic). In these scenarios, it is beneficial to support dynamic switching (i.e., per scheduled PUSCH) between multi-TRP based PUSCH transmission and single-TRP based PUSCH repetitions. A similar principle was also used in NR Rel-16 where dynamic switching between multi-TRP based PDSCH reception and single-TRP based PDSCH reception is supported.

Dynamic switching between PUSCH transmission to a single-TRP and multi-TRP should be supported, i.e., each PUSCH transmission is either targeting reception at one or at two TRPs.

It should be noted that dynamic switching between PUSCH transmissions to a single TRP and to two TRPs should be supported with a same DCI. In case of transmission to a single TRP, only one of the two SRIs/two TMPIs/two TPCs would be used. For this purpose, some indication is needed on whether a DCI is for PUSCH to a single TRP or to two TRPs.

For example, assuming two SRI fields are supported, to indicate PUSCH transmission towards a single TRP, one of the SRI fields may indicate a reserved codepoint that is not associated with any SRI value. If both SRI fields indicate non-reserved codepoints that are associated with SRI values, then PUSCH transmission towards multiple TRPs is indicated.

The same can also be used for other TRP specific parameters such as TPMI and TPC, with a first and a second fields.

Two SRI/TPMI fields are supported for PUSCH repetition towards m-TRP.

To dynamically indicate PUSCH transmission towards a single-TRP or multiple-TRPs, each SRI/TPMI field contains a codepoint that indicates whether the SRI/TPMI field is disabled or not.

TRP to PUSCH Mapping

On TRP to PUSCH transmission occasion mapping, the following working assumption was reached in the last meeting:

For single DCI based M-TRP PUSCH repetition Type A and B, it is possible to configure either cyclic mapping or sequential mapping of UL beams.

The support of cyclic mapping can be optional WD feature for the cases when the number of repetitions is larger than 2.

FFS: Support of half-half mapping;

FFS: Additional considerations on mapping patterns (including required beam switching gaps).

Companies are encouraged to provide further simulation results to decide details.

For cyclic mapping, one concern raised by some companies is that a time gap may be required for the switching. For this, a LS was sent to RAN4 on whether such a gap is needed. However, why a WD can support cyclic mapping for 2 repetitions but cannot support cyclic mapping for more than 2 repetitions is an issue addressed herein. The number of repetitions should not be a determining factor in determining whether a WD can support cyclic mapping or not. Hence, it may be preferable to wait for RAN4 reply to the LS before confirming this working assumption.

CG Support Options

On configured grant support, the following two alternatives were proposed in a 3GPP meeting:

Alt.1: single CG configuration:

Repetitions of a TB transmitted towards MTPR on multiple PUSCH transmission occasions of single CG configuration.

At least for codebook-based CG PUSCH, support configuring 2 SRIs/TPMIs.

Alt.2: multiple CG configurations:

Repetitions of a TB transmitted towards MTRP on more than one PUSCH transmission occasions, where one or more transmission occasions are from one CG configuration and another one or more PUSCH transmission occasions are from another CG configuration.

1 SRI/TPMI is configured/indicated for each CG configuration.

Alt.1 is an extension of the agreements for dynamic scheduling, where a PUSCH for a same TB is repeated towards two TRPs. It is inline with existing CG configuration where a TB is transmitted/re-transmitted within a same CG. In Alt.2, a same TB can be transmitted/retransmitted from different CGs. From CG configuration point of view, this may not require changes of CG configuration (i.e., a single SRI/TPMI is configured for each CG). However, Alt.2 implies that a same HARQ process would be shared by two or more CGs. This is a deviation from existing HARQ operation for CGs and may require large standardization effort. Furthermore, the benefit of Alt.2 is also unclear. Hence, support for Alt. 1 may be preferable.

For CG PUSCH transmission towards multiple TRPs, support Alt.1.

RV Mapping for PUSCH Repetition Type B

In a 3GPP meeting, the following RV mapping for PUSCH Repetition Type A was agreed:

DCI indicates the first RV for the first PUSCH repetition, and the RV pattern (0 2 3 1) is applied separately to PUSCH repetitions of different TRPs with a possibility of configuring RV offset for the starting RV for the second TRP (The same method as PDSCH scheme 4).

Regarding the RV mapping for PUSCH repetition Type B, the following FFS was captured:

FFS: Reuse of the same method for PUSCH repetition Type B.

In one view, the same RV mapping can be applied for both PUSCH repetition types.

Proposed:

Reuse the same RV mapping method as in PUSCH repetition Type A for PUSCH repetition Type B.

Multi-DCI Based PUSCH Transmission Scheme

One of the benefits of using multiple DCIs to schedule PUSCHs for a same TB but targeting two different TRPs is that different MCSs, resource allocations, PMI and number of layers can be flexibly chosen for different PUSCHs to match the channels associated with different TRPs. However, according to 3GPP TS 38.214, there is the following scheduling restriction:

"The WD is not expected to be scheduled to transmit another PUSCH by DCI format 0_0, 0_1 or 0_2 scrambled by C-RNTI or MCS-C-RNTI for a given HARQ process until after the end of the expected transmission of the last PUSCH for that HARQ process."

Figure 15:
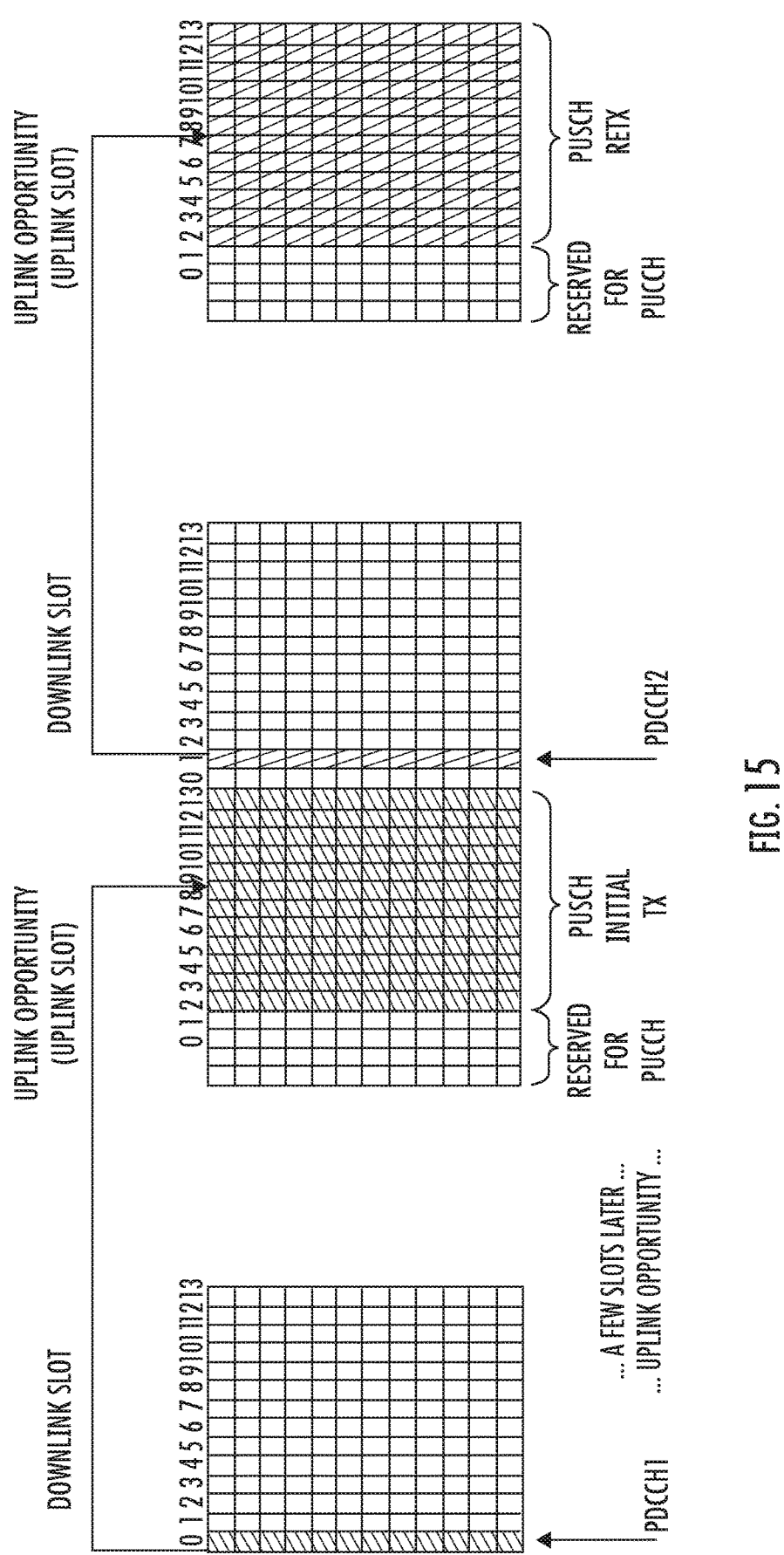
FIG. 15 is a diagram of resource allocation according to some embodiments of the present disclosure.

The 3GPP text above then states that the reception of PDCCH for next PUSCH corresponding to the same HARQ process cannot occur until the previous PUSCH has been transmitted. In FIG. 15, an illustration of this PUSCH scheduling restriction is given. In FIG. 15, PDCCH1 and PDCCH2, schedule an initial PUSCH and a retransmitted PUSCH corresponding to the same HARQ process. Hence, as shown in FIG. 15, one understanding is that PDCCH2 can only be received by the WD after the end of the initial PUSCH transmission scheduled by PDCCH1. Hence, with current NR specification, meeting strict latency requirements is challenging when PUSCH repetitions are scheduled with multiple DCIs. Note that this involves transmissions on same HARQ process (i.e., transmitting the same TB with different RVs via two PUSCHs on the same HARQ process).

For PUSCH repetition over multi-TRP enhancements using two different DCIs, meeting strict latency requirements is challenging.

FIG. 15 show transmission of two PUSCHs scheduled with two uplink DCIs for the same HARQ process according to restrictions specified in NR Rel-15/16.

For URLLC, it is beneficial to allow back-to-back (re) transmission of PUSCH over multiple TRPs where the PUSCHs are scheduled by different DCIs. In this way both reliability and reduced latency are addressed. Back-to-back PUSCH repetition using different DCIs is demonstrated in FIG. 16.

For PUSCH repetition over multi-TRP enhancements using two different DCIs, allow back-to-back (re)transmission of PUSCH over multiple TRPs is beneficial.

Figure 16:
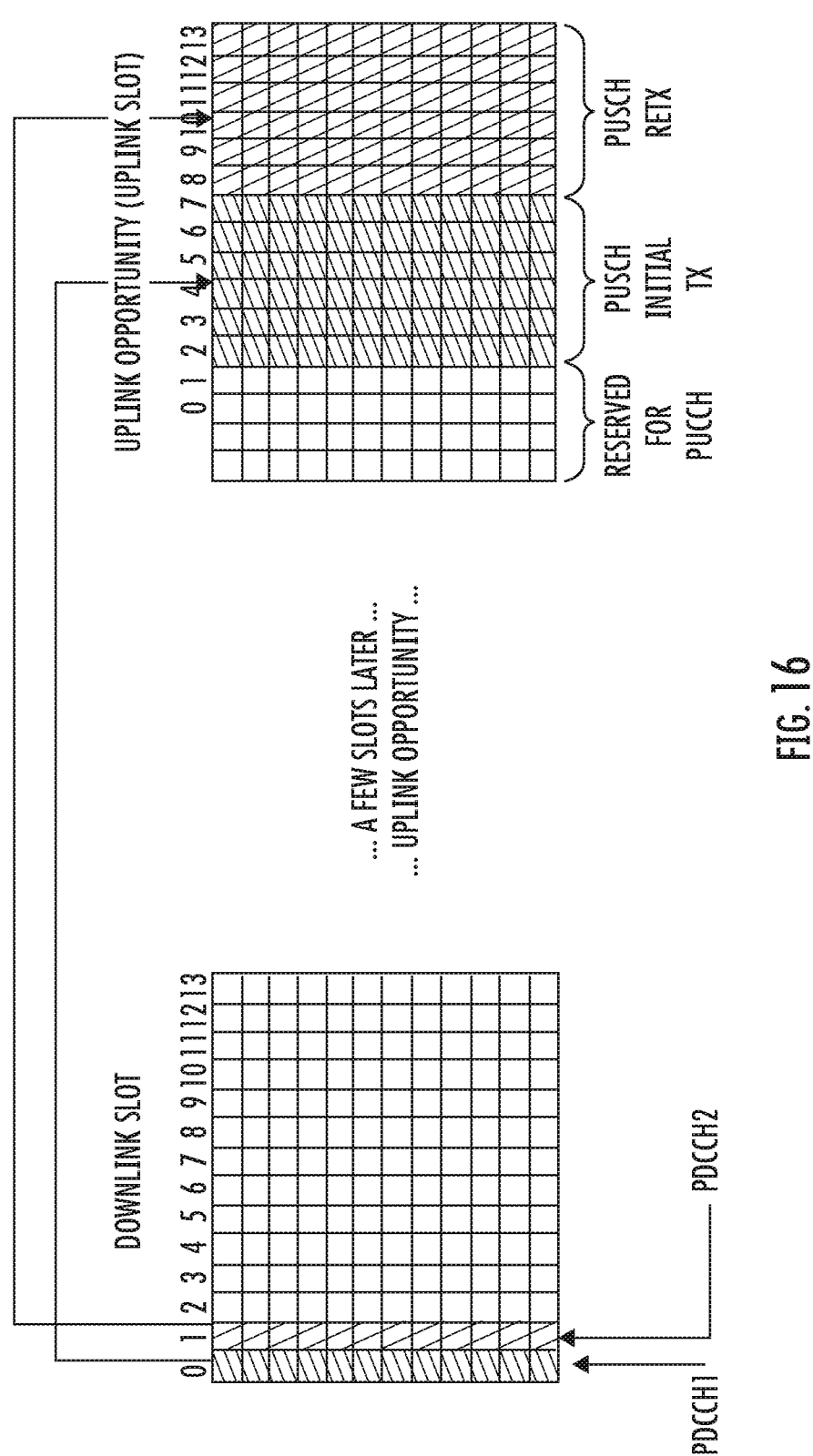
FIG. 16 is a diagram of another resource allocation according to some embodiments of the present disclosure.

FIG. 16 is an example of back-to-back PUSCH repetitions using different DCIs.

Consider allowing back-to-back scheduling of PUSCH repetitions via multiple DCIs over multiple TRPs in NR Rel-17.

Aperiodic CSI on PUSCH

In NR up to 3GPP Release 16, aperiodic CSI report is multiplexed only once with PUSCH even when PUSCH is repeated (i.e., A-CSI is multiplexed with PUSCH in the first PUSCH). If the A-CSI report is not correctly decoded by the gNB, the gNB discards the report and triggers WD 22 for another A-CSI report. If the A-CSI is transmitted by the WD 22 in a slot when the channel associated with a TRP is blocked, then the A-CSI cannot be received with sufficient quality and decoding of the A-CSI may fail at the gNB. To improve the reliability of A-CSI, it may be beneficial to repeat A-CSI over multiple PUSCHs transmitted targeting different TRPs.

If A-CSI is carried in only one PUSCH occasion, the A-CSI may not be received by the gNB when the channel between the WD and a TRP is blocked.

To improve A-CSI reliability, support A-CSI multiplexing on at least two PUSCH occasions towards different TRPs in NR Rel-17.

For multi-TRP PUCCH transmission schemes:

Support multi-TRP inter-slot repetition (Scheme 1):

One PUCCH resource carries UCI, another PUCCH resource or the same PUCCH resource in another one or more slots carries a repetition of the UCI;

FFS: Number of repetitions:

Further study the support (one or both) of the following schemes:

Multi-TRP intra-slot beam hopping (Scheme 2):

UCI is transmitted in one PUCCH resource in which different sets of symbols within the PUCCH resource have different beams;

FFS: More than 2 beam hopping instances per PUCCH resource;

Multi-TRP intra-slot repetition (Scheme 3):

One PUCCH resource carries UCI, another PUCCH resource or the same PUCCH resource in another one or more sub-slots within a slot carries a repetition of the UCI;

Note1: whether to support two PUCCH resources or the same PUCCH resource with different beams for Scheme 1 and 3 to be discussed separately.

For multi-TRP PUCCH transmission schemes,

For Scheme 1, at least PUCCH format 1/3/4 can be used;

FFS: Support of PUCCH format 0/2 for Scheme 1;

FFS: Support of PUCCH formats for Scheme 2 and/or Scheme 3 (if schemes are agreed).

For PUCCH multi-TRP enhancements in FR2,

Support separate power control parameters for different TRP via associating power control parameters via PUCCH spatial relation information:

Note: No spec impact;

For per TRP closed-loop power control for PUCCH, further study the following alternatives considering TPC command when the "closedLoopIndex" values associated with the two PUCCH spatial relation info's are not the same:

Option.1: A single TPC field is used in DCI formats 1_1/1_2, and the TPC value applied for both PUCCH beams;

Option.2: A single TPC field is used in DCI formats 1_1/1_2, and the TPC value applied for one of two PUCCH beams at a slot. The TPC value may be applied for the other PUCCH beam at an another slot;

Option 3: A second TPC field is added in DCI formats 1_1/1_2;

Option 4: A single TPC field is used in DCI formats 1_1/1_2, and indicates two TPC values applied to two PUCCH beams, respectively;

FFS: Transition period for beam/power/frequency change;

FFS: Required power control enhancements for FR1.

For configuration/indication of the number of PUCCH repetitions for Scheme 1, there is no restriction on using 3GPP Rel-15 framework on configuring the number of repetitions.

3GPP Rel-17 feMIMO may additionally consider supporting the dynamic indication of the number of repetitions in RAN1 #104 meeting.

PUCCH Enhancements

In one RAN1 meeting, the following agreements were reached on PUCCH enhancements. In this sub-section, the remaining issues are presented.

For multi-TRP TDM-ed PUCCH transmission schemes:

Support the use of a single PUCCH resource;

Up to two spatial relation info's can be activated per PUCCH resource via MAC CE;

FFS: Required enhancements for FR1.

FFS: Use of multiple PUCCH resources.

For PUCCH multi-TRP enhancements in FR1:

Support separate power control for different TRP;

FFS: how to define the association between PUCCH and TRP;

FFS: required enhancements.

For PUCCH multi-TRP enhancements in Scheme 1, it is possible to configure either cyclic mapping or sequential mapping of spatial relation info's over PUCCH repetitions.

FFS: Applicability of mapping patterns for different beam switching gaps;

The support of cyclic mapping can be optional WD feature for the cases when the number of repetitions is larger than 2;

Note: For Scheme 1, cyclical mapping pattern and sequential mapping pattern are as follows:

Cyclical mapping pattern: the first and second beam are applied to the first and second PUCCH repetition, respectively, and the same beam mapping pattern continues to the remaining PUCCH repetitions;

Sequential mapping pattern: the first beam is applied to the first and second PUCCH repetitions, and the second beam is applied to the third and fourth PUCCH repetitions, and the same beam mapping pattern.

Intra-Slot Beam Hopping

One FFS item from last meeting is whether intra-slot beam hopping (Scheme 2) should be supported.

Further study the support (one or both) of the following schemes.

Multi-TRP Intra-Slot Beam Hopping (Scheme 2)

UCI is transmitted in one PUCCH resource in which different sets of symbols within the PUCCH resource have different beams.

FFS: More than 2 beam hopping instances per PUCCH resource.

In intra-slot beam hopping, different sets of symbols may be transmitted in one PUCCH resource using different beams to different TRPs. In one scenario, the set of symbols with a same frequency in frequency hopping may be associated with a same beam. In this case, the specification change seems small for this scheme. However, the drawback of the scheme is that if one beam/TRP is completely blocked, the PUCCH would be lost because it cannot be decoded generally with half of the symbols. Furthermore, data received from both TRPs are need for the PUCCH decoding, since one TRP does not have access to a complete PUCCH transmission. Thus, on the gNB side, it is a necessity that raw data samples have to be transferred from one TRP to the other, which places a high burden on network side implementation complexity and strict requirements on the backhaul properties. Given these drawbacks, the benefit of intra-slot beam hopping is limited in one view.

Independent per TRP decoding is not possible for intra-slot beam hopping, since received data from one TRP has to be transferred to the other TRP for PUCCH decoding.

Intra-slot beam hopping (Scheme 2) is not supported in NR Rel-17.

Intra-Slot Repetition

Another related open issue is whether intra-slot PUCCH repetition (Scheme 3) should be supported.

Multi-TRP Intra-Slot Repetition (Scheme 3)

One PUCCH resource carries UCI, another PUCCH resource or the same PUCCH resource in another one or more sub-slots within a slot carries a repetition of the UCI.

In intra-slot PUCCH repetition, a PUCCH is repeated in two different sets of symbols within a slot. Each of the two PUCCH transmission occasion is transmitted with one of two beams to one of two TRPs. Unlike in the intra-slot beam hopping case, here the PUCCH is decodable at each TRP. Thus, either individual decoding at each TRP or joint decoding with soft combing can be done at the gNB. More importantly, if one beam/TRP is completely blocked, the PUCCH can still be decoded at the other TRP.

With intra-slot PUCCH repetition, a PUCCH can still be decoded even if one TRP is totally blocked.

Figure 17:
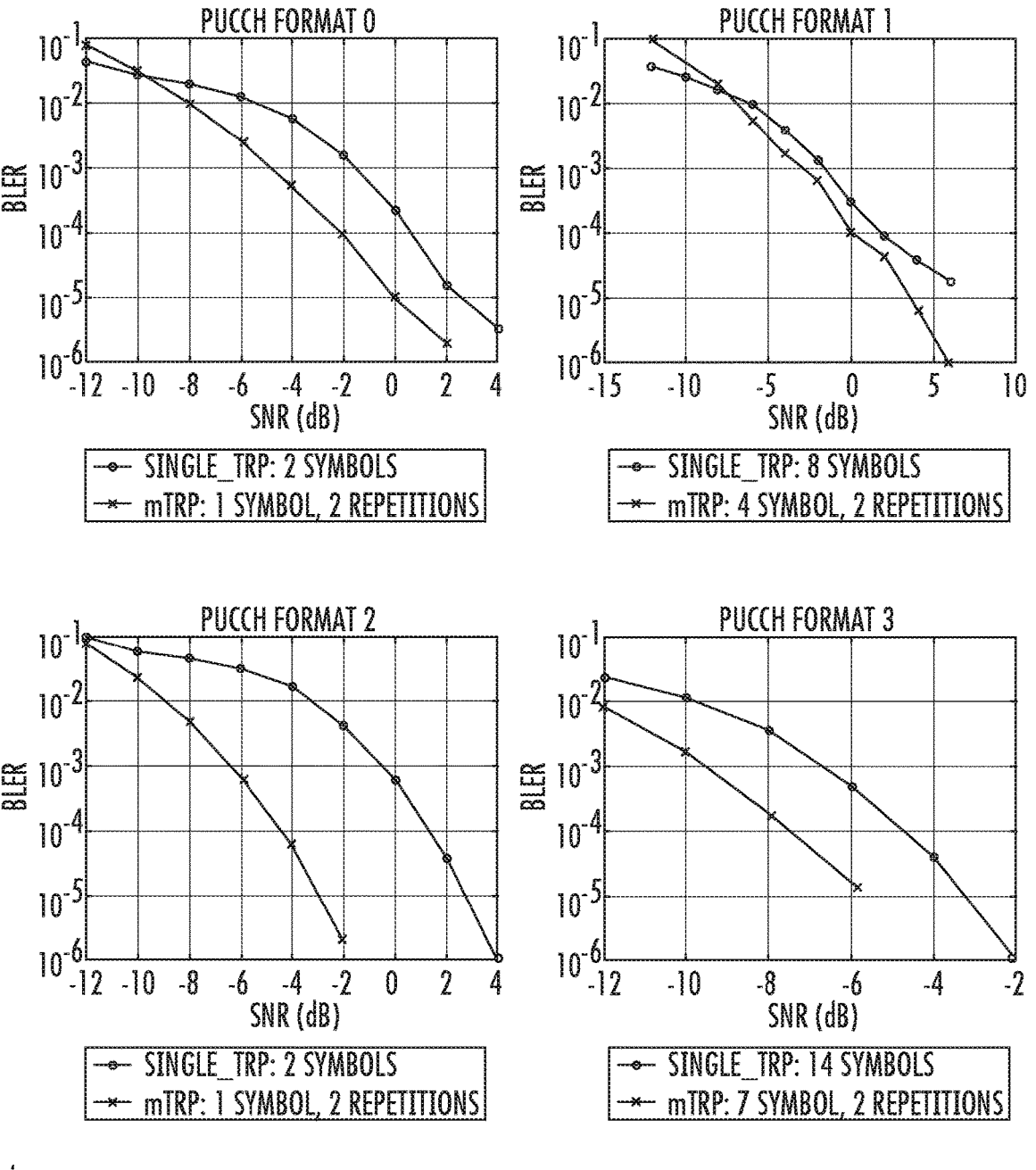
FIG. 17 illustrate performance for different formats according to some embodiments of the present disclosure.

FIG. 17 shows some evaluation results comparing intra-slot repetition vs. transmitting to a single TRP for a same total number of symbols. The simulation is done with two TRPs at 30 GHz. At any given slot, one of the TRPs is blocked by dB with 10% of probability. PUCCH formats 0/1//2/4 were evaluated. Other simulation assumptions can be found in the appendix. It can be seen that under channel blocking, repetition over two TRPs performs much better than single TRP for the same total number of symbols.

FIG. 17 shows PUCCH performance improvement with repetition over 2 TRPs under indoor hot-spot scenario at 4 GHz.

Large performance gain with intra-slot repetition is observed over single TRP for a same total number of symbols and different PUCCH formats.

Therefore, intra-slot PUCCH repetition should be supported in one view.

Support Multi-TRP Intra-Slot Repetition (Scheme 3) in NR Rel-17

Support of PUCCH Format 0/2 for Inter-Slot Repetition

In one 3GPP meeting, Scheme 1 with inter-slot PUCCH repetition was agreed and the PUCCH formats 1/3/4 will be supported in Scheme 1. One FFS item is whether the short PUCCH formats 0/2 should also be supported in Scheme 1. Another FFS item is what PUCCH formats should be supported in Schemes 2 and 3 if they are agreed.

For multi-TRP PUCCH transmission schemes:

For Scheme 1, at least PUCCH format 1/3/4 can be used.

FFS: Support of PUCCH format 0/2 for Scheme 1

FFS: Support of PUCCH formats for Scheme 2 and/or Scheme 3 (if schemes are agreed).

Short PUCCH formats 0/2 was motivated for HARQ Ack feedback in a same slot as the associated PDSCH. In one view, it is more useful to support intra-slot repetition for PUCCH Formats 0/2 with one or two symbols to improve reliability in case one TRP is blocked.

For intra-slot repetition, one simulation results show that large performance gain can be achieved for both short and long PUCCH formats in case of TRP blocking.

Proposal: Both short and long PUCCH formats are supported for Intra-slot repetition.

Power Control

In one 3GPP meeting, it was agreed that separate closed-loop power control for different TRPs is supported for PUCCH repetition to two TRPs. In terms of how to indicate the corresponding TPCs in DCI format 1_1/1_2, the following options were proposed:

Option.1: A single TPC field is used in DCI formats 1_1/1_2, and the TPC value applied for both PUCCH beams;

Option.2: A single TPC field is used in DCI formats 1_1/1_2, and the TPC value applied for one of two PUCCH beams at a slot. The TPC value may be applied for the other PUCCH beam at another slot;

Option 3: A second TPC field is added in DCI formats 1_1/1_2;

Option 4: A single TPC field is used in DCI formats 1_1/1_2, and indicates two TPC values applied to two PUCCH beams, respectively.

In Option 1, the same TPC is applied to both beams/TRPs, which is inconsistent to the agreement that separate closed-loop power control for different TRPs is supported.

In Option 2, a single TPC is indicated and applied to one of the two TRPs, the other TRP is not power controlled or is controlled at next scheduling time. In one view, this is not the proper way for separate power control for each TRP.

In both option 3 and option 4, two TPC values are indicated, one for each TRP. The difference is that in Option 3, two TPC fields are supported while in Option 4, a single TPC field is used. Both can achieve per TRP power control. For Option 4, some further study is needed on how to jointly encode the two TPC values and whether the existing 2 bits TPC field in enough or more bits are needed.

Proposed: For per TRP closed-loop power control for PUCCH, support either Option 3 (two TPC fields in DCI 1_1/1_2) or Option 4 (one codepoint in TPC field indicating two TPC values) in NR Rel-17.

Furthermore, there were the following two related FFS items from the last meeting:

FFS: Transition period for beam/power/frequency change;

FFS: Required power control enhancements for FR1

The same should be applicable for PUCCH. As for power control enhancements for FR1,one understanding is that in case of FR1, pathloss RS may not be explicitly configured for PUCCH. In that case, a default RS is used. For PUCCH repetition to two TRPs, a default RS is not enough for the purpose and explicit configuration of two pathloss RS is needed. Consequently, a WD 22 needs to track two pathloss RS.

TRP to PUCCH Mapping

On TRP to PUCCH transmission occasion mapping in Scheme 1, a working assumption was reached in the last meeting to support both cyclic or sequential mapping. Similar to PUSCH, for cyclic mapping a concern was raised by some companies about a time gap that may be required for the switching between TRPs. For that reason, the following clause was added in the working assumption:

The support of cyclic mapping can be optional WD feature for the cases when the number of repetitions is larger than 2.

However, why a WD 22 that can support cyclic mapping for 2 repetitions cannot support cyclic mapping for more than 2 repetitions may be addressed. The number of repetitions should not be a determining factor in determining whether a WD 22 can support cyclic mapping or not.

Based on the discussion in the previous sections the following are proposed:

Proposal 1 . . . Confirm the working assumption for PDCCH reliability enhancements with non-SFN schemes and Option 2+Case 1, i.e. support Alt3 (two SS sets associated with corresponding CORESETs).

Proposal 2 . . . When PDCCH repetition is enabled for the WD, the default is that two PDCCH candidates are linked. FFS whether more than two can be configured to be linked.

Proposal 3 . . . Two blind decodes per PDCCH pair is counted towards BD limit for the WD when the PDCCH consists of two PDCCH candidates that are linked.

Proposal 4 . . . Support Alt.2 and use one of the linked PDCCH candidates in a CORESET having the lowest controlResourceSetId or a SS set with lowest searchSpaceId in the linked SS sets.

Proposal 5 . . . The PDCCH symbol occurring latest in time in a pair of linked PDCCH candidates is defined as the last symbol regardless of which PDCCH candidate(s) the WD actually have detected.

Proposal 6 . . . The DAI counter DAI is incremented only at the first time a PDCCH is transmitted (i.e., at the first PDCCH occasion) in a linked pair of PDCCH candidates.

Proposal 7 . . . The existing procedure for type 2 HARQ-ACK codebook construction is applied only for the first PDCCH occasion in case of PDCCH repetition regardless whether the PDCCH is actually detected in the first or/and the second PDCCH occasion.

Proposal 8 . . . In case the CORESET is not configured as unavailable for PDSCH and if a PDSCH scheduled by a pair of PDCCHs overlap with resources in the CORE- SETs containing the PDCCHs, PDSCH rate matching is done around the union of the linked PDCCH candidates and corresponding DM-RS.

Proposal 9 . . . DCI Format 2-2/2-3 are also supported by multi-TRP based PDCCH enhancements.

Proposal 10 . . . One of the two activated TCI states is used as the default TCI state, FFS whether the one is specified or indicated in a MAC CE activating the TCI states.

Proposal 11 . . . Consider finalizing PDCCH enhancement with intra-slot PDCCH repetition first.

Proposal 12 . . . For codebook/non-codebook based multi-TRP PUSCH, support two separate SRI fields in DCI, where the first SRI field indicates the SRI(s) corresponding to the first TRP and the second SRI field indicates the SRI(s) corresponding to the second TRP.

Proposal 13 . . . For codebook based multi-TRP PUSCH, support two separate TPMI fields in DCI, where the first TPMI field indicates the TPMI corresponding to the first TRP and the second TPMI field indicates the TPMI corresponding to the second TRP. The number of layers indicated in the first TPMI field and the second TPMI field are the same.

Proposal 14 . . . For per TRP closed-loop power control for PUSCH, Option 3 is supported where a second TPC field is added in DCI formats 0_1/0_2.

Proposal 15 Dynamic switching between PUSCH transmission to a single-TRP and multi-TRP should be supported, i.e. each PUSCH transmission is either targeting reception at one or at two TRPs.

Proposal 16 Two SRI/TPMI fields are supported for PUSCH repetition towards m-TRP.

Proposal 17 . . . To dynamically indicate PUSCH transmission towards a single-TRP or multiple-TRPs, each SRI/TPMI field contains a codepoint that indicates whether the SRI/TPMI field is disabled or not.

Proposal 18 . . . For CG PUSCH transmission towards multiple TRPs, support Alt.1.

Proposal 19 Reuse the same RV mapping method as in PUSCH repetition Type A for PUSCH repetition Type B Proposal 20. Consider allowing back-to-back scheduling of PUSCH repetitions via multiple DCIs over multiple TRPs in NR Rel-17.

Proposal 21 . . . To improve A-CSI reliability, support A-CSI multiplexing on at least two PUSCH occasions towards different TRPs in NR Rel-17.

Proposal 22 . . . Intra-slot beam hopping (Scheme 2) is not supported in NR Rel-17.

Proposal 23. Support Multi-TRP intra-slot repetition (Scheme 3) in NR Rel-17.

Proposal 24 . . . Both short and long PUCCH formats are supported for Intra-slot repetition.

Proposal 25 For per TRP closed-loop power control for PUCCH, support either Option 3 (two TPC fields in DCI 1_1/1_2) or Option 4 (one codepoint in TPC field indicating two TPC values) in NR Rel-17.

| Parameters | Values |
| --- | --- |
| Baseline schemes | Single TRP Rel-15 PUCCH with repetition |
| mTRP schemes | Intra-slot repetition over 2 TRPs |
| PUCCH formats | Formats 0 to 4 |
| # symbols | Format 0: 2 for single TRP, 1 for mTRP with 2 repetitions |
| | Format 1: 8 for single TRP, 4 for mTRP with 2 repetitions |

-continued

| Parameters | Values |
|---|---|
| | Format 2: 2 for single TRP, 1 for mTRP with 2 repetitions |
| | Format 4: 14 for single TRP, 7 for mTRP with 2 repetitions |
| # of RBs | Format 0: 1 |
| | Format 1: 1 |
| | Format 2: 7 |
| | Format 4: 1 |
| UCI payload | Format 0: 2 |
| | Format 1: 2 |
| | Format 2: 8 |
| | Format 4: 4 |
| Precoding assumptions | PMI based |
| Frequency hopping | On |
| Blocking enabled | yes |
| Blocking dB | 10 |
| Blocking prob per TRP | 10% |
| Power offset between TRPs | 0 dB |
| Simultaneous Rx from 2 TRPs | No |
| Channel estimation | Practical |
| Soft combining | yes |
| Scenarios | Indoor hot-spot at 4 GHz |

Simulation Assumptions for PUCCH

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node comprising processing circuitry configured to:

transmit to the WD a transmission and reception point, TRP, indicator, TRPI, field, the TRPI field indicating one or both of a first TRP and a second TRP to which a physical uplink shared channel, PUSCH, is to be transmitted, the TRPI field indicating which of a plurality of sounding reference signals, SRS, of an SRS resource set is enabled for the indicated one or both TRPs, the TRPI field indicating at least three code-points, a first codepoint indicating a first SRS resource set, a second codepoint indicating a second SRS resource set, and a third codepoint indicating both the first and the second SRS resource sets; and schedule, by sending a downlink control information, DCI, to the WD, a PUSCH transmission by the WD in at least one PUSCH transmission occasion associated with the one or both of the first TRP and the second TRP.

2. The network node of claim 1, wherein the DCI that schedules the PUSCH transmission includes a first reference signal resource indicator, SRI, field and a second SRI field.

3. The network node of claim 1, wherein the DCI that schedules the PUSCH transmission includes a first transmit precoding matrix indicator, TPMI, field and a second TMPI field.

4. The network node of claim 1, wherein the scheduled PUSCH transmission by the WD is according to a first SRS resource indicator, SRI, a first transmit precoding matrix indicator, TPMI, and a first transmit power control, TPC command.

5. A method implemented in a network node configured to communicate with a wireless device, WD, the method comprising:

transmitting to the WD a transmission and reception point, TRP, indicator, TRPI, field, the TRPI field indicating one or both of a first TRP and a second TRP to which a physical uplink shared channel, PUSCH, is to be transmitted, the TRPI field indicating which of a plurality of sounding reference signals, SRS, of an SRS resource set is enabled for the indicated one or both TRPs, the TRPI field indicating at least three code-points, a first codepoint indicating a first SRS resource set, a second codepoint indicating a second SRS resource set, and a third codepoint indicating both the first and the second SRS resource sets; and scheduling, by sending a downlink control information, DCI, to the WD, a PUSCH transmission by the WD in at least one PUSCH transmission occasions associated with the one or both of the first TRP and the second TRP.

6. The method of claim 5, wherein the DCI that schedules the PUSCH transmission includes a first sounding reference signal resource indicator, SRI, field and a second SRI field.

7. The method of claim 5, wherein the DCI that schedules the PUSCH transmission includes a first transmit precoding matrix indicator, TPMI, field and a second TMPI field.

8. The method of claim 5, wherein the scheduled PUSCH transmission by the WD is according to a first SRS resource indicator, SRI, a first transmit precoding matrix indicator, TPMI, and a first transmit power control, TPC command.

9. A wireless device, WD, configured to communicate with one or more network nodes, the WD comprising a radio interface configured to:

receive from one of the one or more network nodes a configuration of a transmission and reception point, TRP, indicator, TRPI, field, the TRPI field indicating one or both of a first TRP and a second TRP to which a Physical Uplink Shared Channel, PUSCH, transmission is to be transmitted, the TRPI field indicating which of a plurality of sounding reference signals, SRS, of an SRS resource set is enabled for the indicated one or both TRPs, the TRPI field indicating at least three codepoints, a first codepoint indicating a first SRS resource set, a second codepoint indicating a second SRS resource set, and a third codepoint indicating both the first and the second SRS resource sets;

receive a downlink control information, DCI, configured to schedule a PUSCH transmission in at least one PUSCH transmission occasion, transmit the scheduled PUSCH transmission to the indicated one or both of the first TRP and the second TRP during the at least one PUSCH transmission occasion.

10. The WD of claim 9, wherein the radio interface is further configured to transmit the scheduled PUSCH in the at least one PUSCH transmission occasion according to one of a first and second sounding reference signal resource indicator, SRI, one of a first and second transmit precoding matrix indicator, TPMI, and one of a first and second transmit power control, TPC, command.

11. The WD of claim 9, wherein the radio interface is further configured to transmit the scheduled PUSCH in at least a first transmission occasion according to one of a first sounding reference signal resource indicator, SRI, a first TPMI, and a first TPC and in a second transmission occasion(s) according to one of a second SRI, a second TPMI, and a second TPC when both the first and the second SRS resource sets are indicated by the third codepoint.

12. A method in a wireless device, WD, configured to communicate with one or more network nodes, the method comprising:

receiving from one of the one or more network nodes a configuration of a transmission and reception point, TRP, indicator, TRPI, field, the TRPI field indicating one or both of a first TRP and a second TRP to which a Physical Uplink Shared Channel, PUSCH, transmission is to be transmitted, the TRPI field indicating which of a plurality of sounding reference signals, SRS, of an SRS resource set is enabled for the indicated one or both TRPs, the TRPI field indicating at least three codepoints, a first codepoint indicating a first SRS resource set, a second codepoint indicating a second SRS resource set, and a third codepoint indicating both the first and the second SRS resource sets;

receiving a downlink control information, DCI, configured to schedule a PUSCH transmission in at least one PUSCH transmission occasion; and transmitting the scheduled PUSCH transmission to the indicated one or both of the first TRP and the second TRP during the at least one PUSCH transmission occasion.

13. The method of claim 12, further comprising transmitting the scheduled PUSCH in the at least one PUSCH transmission occasion according to one of a first and second sounding reference signal resource indicator, SRI, one of a first and second transmit precoding matrix indicator, TPMI, and one of a first and second transmit power control, TPC, command.

14. The method of claim 12, further comprising transmitting the scheduled PUSCH in at least a first transmission occasion according to one of a first sounding reference signal resource indicator, SRI, a first TPMI, and a first TPC and in a second transmission occasion(s) according to one of a second SRI, a second TPMI, and a second TPC when both the first and the second SRS resource sets are indicated by the third codepoint.

* * * * *